(12) United States Patent
Zanka et al.

(10) Patent No.: US 8,211,978 B2
(45) Date of Patent: Jul. 3, 2012

(54) MOLDABILITY MODIFIER AND POLYPROPYLENE RESIN COMPOSITION USING THE SAME

(75) Inventors: Yukihito Zanka, Mie (JP); Yuji Ryosho, Mie (JP); Ken Shimizu, Mie (JP); Masashi Shimouse, Mie (JP); Shigeo Mizukami, Mie (JP)

(73) Assignee: Japan Polypropylene Corporation, Tokyo (JP)

( * ) Notice: Subject to any disclaimer, the term of this patent is extended or adjusted under 35 U.S.C. 154(b) by 835 days.

(21) Appl. No.: 12/294,100

(22) PCT Filed: Mar. 23, 2007

(86) PCT No.: PCT/JP2007/056102
§ 371 (c)(1), (2), (4) Date: Oct. 16, 2008

(87) PCT Pub. No.: WO2007/111277
PCT Pub. Date: Oct. 4, 2007

(65) Prior Publication Data
US 2009/0131576 A1    May 21, 2009

(30) Foreign Application Priority Data
Mar. 23, 2006 (JP) .................. P.2006-079987

(51) Int. Cl.
*C08L 53/00* (2006.01)
*C08L 23/00* (2006.01)
*C08L 23/04* (2006.01)
*C09J 7/02* (2006.01)
*C08K 5/00* (2006.01)

(52) U.S. Cl. ............ 525/89; 524/505; 524/515; 525/88; 525/240

(58) Field of Classification Search .................. 524/505, 524/515; 525/89, 88, 240
See application file for complete search history.

(56) References Cited

U.S. PATENT DOCUMENTS

| 7,923,501 B2 * | 4/2011 | Shimouse et al. ............ 524/449 |
| 2002/0035209 A1 | 3/2002 | Kanzaki et al. |
| 2004/0014871 A1 * | 1/2004 | Zanka et al. .................. 524/505 |
| 2005/0154131 A1 | 7/2005 | Kanzaki et al. |
| 2005/0228141 A1 | 10/2005 | Moritomi et al. |
| 2006/0160942 A1 | 7/2006 | Kanzaki |
| 2007/0010622 A1 * | 1/2007 | Naito et al. ..................... 525/89 |

FOREIGN PATENT DOCUMENTS

| DE | 10 2004 055 446 A1 | 6/2005 |
| EP | 1 086 986 | 3/2001 |
| JP | 11 222547 | 8/1999 |
| JP | 2001 288331 | 10/2001 |
| JP | 2002 12734 | 1/2002 |
| JP | 2003 105163 | 4/2003 |
| JP | 2004 18647 | 1/2004 |
| JP | 2004 256808 | 9/2004 |
| JP | 2005 146160 | 6/2005 |
| JP | 2005 213490 | 8/2005 |

* cited by examiner

*Primary Examiner* — Mark Eashoo
*Assistant Examiner* — Angela C Scott
(74) *Attorney, Agent, or Firm* — Oblon, Spivak, McClelland, Maier & Neustadt, L.L.P.

(57) ABSTRACT

A moldability modifier capable of improving molding processability, and a polypropylene resin composition using the same suitable for automobile exterior parts are provided. The invention relates to a moldability modifier comprising propylene block copolymer (A) containing from 80 to 98 wt % of a propylene homopolymer portion (A1) and from 2 to 20 wt % of a propylene/ethylene random copolymer portion (A2), wherein the MFR of (A1) is 300 g/10 min or more, the ethylene content of (A2) is from 10 to 70 wt %, the [η] of (A2) is 6.5 dl/g or more, and the MFR as a whole is 40 g/10 min or more; and propylene block copolymer (B) containing from 20 to 79 wt % of a propylene polymer portion (B1) and from 21 to 80 wt % of a propylene/ethylene random copolymer portion (B2), wherein the MFR of (B1) is 20 g/10 min or more, the ethylene content of (B2) is from 20 to 70 wt %, the [η] of (B2) is from 2.5 to 9.0 dl/g, and the MFR as a whole is from 0.1 to 50 g/10 min; and a polypropylene resin composition using the same.

11 Claims, No Drawings

MOLDABILITY MODIFIER AND POLYPROPYLENE RESIN COMPOSITION USING THE SAME

TECHNICAL FIELD

The present invention relates to a moldability modifier for polypropylene resin, and a polypropylene resin composition containing the moldability modifier, and more specifically relates to a moldability modifier capable of suppressing generation of flow marks and voids and modifying the appearance of moldings, and also relates to a polypropylene resin composition containing the moldability modifier having good molding processability in injection molding, excellent in flow mark characteristics and void characteristics in molding, and suitable for injection moldings such as automobile exterior parts.

BACKGROUND ART

Since polypropylene resins are light in weight and excellent in recycling efficiency, demands for polypropylene resins as automobile parts are increasing. Specifically, polypropylene resin compositions obtained by blending ethylene thermoplastic elastomer component such as an ethylene/propylene copolymer or an ethylene/butene copolymer, and an inorganic filler such as talc with crystalline polypropylene resin are used. It is proposed to improve the moldability, mechanical and physical properties, appearance and the like by arbitrarily selecting polypropylene resins, various kinds of elastomer components and inorganic fillers according to purposes.

In recent years, there are demands for polypropylene resin compositions capable of being molded into thinner moldings in shorter molding time for the purpose of production of light weighted automobile parts more efficiently. However, there arises a problem in molding these products such that molding appearance failures, e.g., flow marks (patterns like tiger stripes appearing on the surfaces of the moldings), are liable to occur. Especially, in the parts of such design as an uncoated area is bared such as a bumper, there is a problem that the designing value as commercial products is impaired. Further, to improve a production cycle means to shorten the pressing time in injection molding, which results, in this case, in the problem of generation of rimple-like molding failure due to voids.

As improving techniques of such flow marks, the techniques disclosed in patent literatures 1, 2 and 3 are exemplified.

That is, an object of patent literature 1 is to provide a polypropylene resin composition that is hardly accompanied by generation of flow marks or specks, and excellent in appearance when molded. As the means for solving this object, a polypropylene resin composition comprising polypropylene resin (A) having a propylene homopolymer portion having intrinsic viscosity $[\eta]_{AP}$ of 1.3 dl/g or less and propylene/ethylene random copolymer portion having an intrinsic viscosity $[\eta]_{AEP}$ of 3.0 dl/g or less, and $[\eta]_{BEP}$ of from 8.0 to 15 dl/g blended in a specific proportion is disclosed. However, in patent literature 1, although a dye swell ratio is described, not only the substantial improving level of flow marks is not described, but also the moldability improvement of a propylene/ethylene block copolymer having a high rubber content is not described at all.

On the other hand, an object of patent literature 2 is to provide a polypropylene resin composition capable of revealing good appearance and excellent in moldability. As the means for solving this object, the use of a moldability modifier comprising a propylene/ethylene block copolymer having specific physical properties is disclosed. Specifically, a propylene/ethylene block copolymer having an MFR of the propylene homopolymer portion (crystalline component) of 500 g/10 min or more and an MFR of the whole of propylene/ethylene block copolymer of 100 g/10 min or more, and a die swell ratio of from 1.2 to 2.5 is disclosed.

However, good fluidity can be obtained with these techniques, but the use amount of expensive ethylene thermoplastic elastomers should be increased to compensate for impact resistance, so that there is room for improvement.

Further, in patent literature 3, an object is to provide a propylene resin composition well balanced in moldability and physical properties such as rigidity and impact strength. In the means for solving this object, ICP (component a) having an MFR of from 10 to 130 g/10 min as a whole and the weight average molecular weight of the rubber component of from 200,000 to 1,000,000 is disclosed. Another ICP (component b) different from the propylene/ethylene block copolymer having an MFR of from 0.1 to 8 g/10 min as a whole and the weight average molecular weight of the rubber component of from 300,000 to 900,000 is also disclosed. Further, a technique of blending, in addition to Components a and b, an inorganic filler (Component c), polyethylene (Component d), and a fatty acid amide or the derivative thereof (Component e) in a specific proportion is also disclosed. However, in patent literature 3, scratch resistance alone is made great account of and appearance of moldings is not taken into consideration as the object to be solved. Accordingly, patent literature 3 does not disclose or suggest at all about the relationship among the fluidity of the crystalline propylene polymer portion, the viscosity ratio of the crystalline propylene polymer portion to the ethylene/propylene random copolymer portion, and the appearance of a molding represented by flow mark characteristic.

Further, in recent years, from the viewpoint including the manufacturing costs, it has been demanded that effect can be achieved even with a little absolute amounts of these components, that the fluctuation in physical properties of moldability modifiers in addition is little considering the use of moldability modifiers by a master batch system, and that moldability modifiers have effect as the moldability modifiers irrespective of the kinds. The above patent literatures disclose nothing in connection with these new demands, and many objects are still remained unsolved at present.

Patent Literature 1

JP-A-2002-12734 (the term "JP-A" as used herein refers to an "unexamined published Japanese patent application")

Patent Literature 2

JP-A-2004-18647

Patent Literature 3

JP-A-2001-288331

DISCLOSURE OF THE INVENTION

Problems that the Invention is to Solve

The objects of the invention are to solve the prior art problems and, for efficiently manufacturing large size and high quality moldings such as bumpers, to provide a moldability modifier for polypropylene resin that brings about little variation in physical properties of the material to be modified, and capable of improving molding process characteristics such as flow marks and voids by the addition in a small amount as the high performance third component to a propylene block copolymer difficult to cause generation of flow marks and resin component having a high elastomer content, to thereby reduce the use amount of an expensive ethylene elastomer.

A further object is to provide a polypropylene resin composition suitable for automobile exterior parts including bumper, rocker mogol, side mogol and over fender, capable of revealing good appearance and excellent in molding processability with the moldability modifier.

Means for Solving the Problems

As a result of extensive examinations to solve the above problems, the present inventors have found that the combination of a propylene block copolymer (component (A)) having broad molecular weight distribution having both a high fluidity crystalline propylene polymer portion and a high molecular weight propylene/ethylene random copolymer portion, and a propylene block copolymer (component (B)) having a high content of a high molecular weight propylene/ethylene random copolymer portion functions as a moldability modifier capable of solving the problems when added to general purpose resin components as the third component even in a small amount, thus the present invention has been accomplished.

That is, according to a first invention of the invention, a moldability modifier comprising the component (A) and component (B) shown below is provided.
Component (A): A propylene block copolymer containing from 80 to 98 wt % of crystalline propylene homopolymer portion (A1) and from 2 to 20 wt % of propylene/ethylene random copolymer portion (A2), and satisfying the following requisites (a-1) to (a-4):
(a-1): A melt flow rate (JIS K7210, temperature: 230° C., load: 21.18N) of the crystalline propylene homopolymer portion (A1) is 300 g/10 min or more;
(a-2): An ethylene content of the propylene/ethylene random copolymer portion (A2) is from 10 to 70 wt %;
(a-3): An intrinsic viscosity $[\eta]_{copoly}$ of the propylene/ethylene random copolymer portion (A2) is 6.5 dl/g or more; and
(a-4): A melt flow rate of the propylene block copolymer (A) as a whole ($MFR_A$) is 40 g/10 min or more,
Component (B): A propylene block copolymer containing from 20 to 79 wt % of a crystalline propylene homopolymer portion (B1) and from 21 to 80 wt % of propylene/ethylene random copolymer portion (B2), and satisfying the following requisites (b-1) to (b-4):
(b-1): A melt flow rate (JIS K7210, temperature: 230° C., load: 21.18N) of the crystalline propylene homopolymer portion (B1) is 20 g/10 min or more;
(b-2): An ethylene content of propylene/ethylene random copolymer portion (B2) is from 20 to 70 wt %;
(b-3): An intrinsic viscosity $[\eta]_{copoly}$ of the propylene/ethylene random copolymer portion (B2) is from 2.5 to 9.0 dl/g; and
(b-4): A melt flow rate of the propylene block copolymer (B) as a whole ($MFR_B$) is from 0.1 to 50 g/10 min.

According to a second invention of the invention, the moldability modifier as described in the first invention is provided, wherein a ratio of component (A) and component (B) (component (A)/component (B)) is from 19/1 to 1/19 (weight ratio).

According to a third invention of the invention, the moldability modifier as described in the first or second invention is provided, wherein a ratio of the melt flow rate of component (A) ($MFR_A$) and the melt flow rate of component (B) ($MFR_B$) ($MFR_A/MFR_B$) exceeds 1.

According to a fourth invention of the invention, a polypropylene resin composition is provided, which comprises: from 2 to 30 weight parts of the moldability modifier as described in any of the first to third inventions; and 100 weight parts of a polypropylene resin material to be modified.

According to a fifth invention of the invention, the polypropylene resin composition as described in the fourth invention is provided, wherein the polypropylene resin material to be modified is (C) propylene/ethylene block copolymer.

According to a sixth invention of the invention, the polypropylene resin composition as described in the fourth invention is provided, wherein the polypropylene resin material to be modified is a polypropylene resin composition containing from 65 to 99 wt % of (C) propylene/ethylene block copolymer, and from 1 to 35 wt % of (D) inorganic filler.

According to a seventh invention of the invention, the polypropylene resin composition as described in the fourth invention is provided, wherein the polypropylene resin material to be modified is a polypropylene resin composition containing from 65 to 99 wt % of (C) propylene/ethylene block copolymer, and from 1 to 35 wt % of (E) ethylene elastomer or styrene elastomer.

According to an eighth invention of the invention, the polypropylene resin composition as described in the fourth invention is provided, wherein the polypropylene resin material to be modified is a polypropylene resin composition containing: from 40 to 98 wt % of (C) propylene/ethylene block copolymer having a content of 15 wt % or more of rubber extracted with orthodichlorobenzene; from 1 to 40 wt % of (D) inorganic filler; and from 1 to 20 wt % of (E) ethylene elastomer or styrene elastomer.

According to a ninth invention of the invention, the polypropylene resin composition as described in any of the fourth to eighth inventions is provided, wherein when the moldability modifier is blended with the polypropylene resin material to be modified, the rate of change of MFR, flexural modulus, and IZOD impact strength at −30° C. is less than ±25%.

According to a tenth invention of the invention, the polypropylene resin composition as described in any of the fourth to ninth inventions is provided, wherein the polypropylene resin composition has an MFR of 10 g/10 min or more, and IZOD impact strength at −30° C. of 3 kg/cm² or more.

Advantage of the Invention

The moldability modifier according to the invention can be used as a molding appearance modifier capable of improving the appearance of a molding of a polypropylene resin composition even with a small addition amount without impairing physical properties and moldability. A polypropylene resin composition blended with the moldability modifier for polypropylene resin is excellent in molding processability and flow mark characteristics, and especially suitable for the material of large sized injection moldings such as automobile exterior parts and the like. The moldability modifier can also cope with rimple-like appearance failure in high cycle molding.

BEST MODE FOR CARRYING OUT THE INVENTION

The invention relates to a moldability modifier comprising propylene block copolymer component (A) containing crystalline propylene homopolymer portion (A1) and propylene/ethylene random copolymer portion (A2), and having a specific physical value; and propylene block copolymer component (B) containing a crystalline propylene homopolymer portion (B1) and propylene/ethylene random copolymer portion (B2), and having a specific physical value, and also relates to a polypropylene resin composition using the moldability modifier. As the moldability modifier for a polypropylene resin composition capable of improving the appearance of moldings by the addition to general purpose resin components as the third component in a small amount, a propylene block copolymer having broad molecular weight distribution having both a high fluidity crystalline propylene polymer portion and a high molecular weight propylene/ethylene random copolymer portion (a rubber component) is effective. The moldability modifier has advantages such that, when the amount of the rubber component is increased, the appearance improving effect is further bettered and physical properties and moldability are not impaired at the time of addition, although it depends upon the kind of the material to be modified. The moldability modifier will be described in detail below.

[I] Moldability Modifier

In the invention, a moldability modifier means a resin material capable of reducing or getting rid of the later described molding failures occurring in a molding comprising a polypropylene resin material to be modified by blending with the polypropylene resin material to be modified. The molding failure here means mainly flow marks.

Component (A)

Component (A) of the invention is a propylene block copolymer containing crystalline propylene homopolymer portion (A1) and propylene/ethylene random copolymer portion (A2), and satisfying the following requisites (a-1) to (a-4)

Crystalline propylene homopolymer portion (A1) in component (A) accounts for from 80 to 98 wt % of the whole, preferably from 82 to 97 wt %, and more preferably from 85 to 95 wt %, and propylene/ethylene random copolymer portion (A2) accounts for from 2 to 20 wt % of the whole, preferably from 3 to 18 wt %, and more preferably from 5 to 15 wt %. When the proportion that (A2) accounts for is less than 2 wt %, the improvement effect of flow mark appearance is inferior, while when it is more than 20 wt %, gelation is liable to occur and appearance is adversely influenced, so that not preferred.

Component (A) is used for the purpose of revealing fluidity and good flow mark appearance. The moldability modifier contains a propylene homopolymer very excellent in fluidity and an ethylene/propylene copolymer having extremely high molecular weight, and the performance of the moldability modifier is achieved by containing both of the components.

Here, the proportion of the propylene/ethylene random copolymer portion is a value measured according to the later described method.

(a-1): Melt Flow Rate of Crystalline Propylene Homopolymer Portion (A1)

The melt flow rate (hereinafter sometimes referred to as MFR, temperature: 230° C., load: 21.18N) of crystalline propylene homopolymer portion (A1) is 300 g/10 min or more, preferably from 450 to 3,000 g/10 min, and more preferably from 500 to 2,000 g/10 min. When MFR is less than 300 g/10 min, fluidity lowers and not preferred.

The MFR of crystalline polypropylene polymer portion is an MFR after completion of the polymerization of a propylene homopolymer portion (which, however, may be copolymerized with a comonomer of an extremely small amount so as not to lose crystallinity, e.g., 0.5 wt % or less). The propylene homopolymer may be obtained by single-stage polymerization or multi-stage polymerization. In the case of multi-stage polymerization, the MFR is an MFR of the crystalline polypropylene polymer portion taken out of the final polymerization tank. The MFR can be adjusted by the addition of hydrogen in polymerization to control the molecular weight.

The MFR as used here is a value measured in conformity with JIS K7210 at 230° C. and a load of 21.18N.

(a-2): Ethylene Content of Propylene/Ethylene Random Copolymer Portion (A2)

The ethylene content of propylene/ethylene random copolymer portion (A2) is from 10 to 70 wt %, preferably from 20 to 65 wt %, and more preferably from 30 to 60 wt %. When the ethylene content of (A2) is less than 10 wt %, flow marks become conspicuous, while when it exceeds 70 wt %, impact resistance is deteriorated, and so not preferred.

The ethylene content in the propylene/ethylene random copolymer portion is a value measured according to the method described later.

(a-3): Intrinsic Viscosity $[\eta]_{copoly}$ of Propylene/Ethylene Random Copolymer Portion (A2)

The intrinsic viscosity $[\eta]_{copoly}$ of propylene/ethylene random copolymer portion (A2) is 6.5 dl/g or more, preferably from 7.0 to 15 dl/g, and more preferably from 7.5 to 10 dl/g. When the intrinsic viscosity $[\eta]_{copoly}$ is less than 6.5 dl/g, the improving efficiency of flow mark appearance is inferior.

The intrinsic viscosity $[\eta]_{copoly}$ of propylene/ethylene random copolymer portion as used here is a value measured according to the method described later.

(a-4): MFR of the Whole of Component (A)

The melt flow rate of propylene block copolymer (A) ($MFR_A$) is 40 g/10 min or more, preferably from 60 to 250 g/10 min, and more preferably from 80 to 250 g/10 min. When the ($MFR_A$) is less than 40 g/10 min, the molding processability in injecting molding is inferior, while when it exceeds 250 g/10 min, impact characteristics and mechanical strength are insufficient and not preferred.

Component (B)

Component (B) in the invention is a propylene block copolymer containing crystalline propylene homopolymer portion (B1) and propylene/ethylene random copolymer portion (B2), and satisfying the following requisites (b-1) to (b-4).

Crystalline propylene polymer portion (B1) accounts for from 20 to 79 wt % of the whole of component (B), preferably from 30 to 70 wt %, and more preferably from 40 to 60 wt %, and propylene/ethylene random copolymer portion (B2) accounts for from 21 to 80 wt % of the whole, preferably from 30 to 70 wt %, and more preferably from 40 to 60 wt %. When the proportion that (B1) accounts for is less than 20 wt %, the effect as the molding appearance modifier decreases, so that it is necessary to increase the amount, which results in the reduction of physical properties and molding properties. On the other hand, when the proportion exceeds 79 wt %, the copolymer itself or the material added as the modifier should be homogeneously dispersed in the material to be modified in injection molding to improve appearance, so that not preferred.

The proportion of the propylene/ethylene random copolymer portion (the rubber component) as used here is a value measured according to the method described later.

(b-1): MFR of Crystalline Propylene Homopolymer Portion (B1)

The MFR (temperature: 230° C., load: 21.18N) of crystalline propylene homopolymer portion (B1) is 20 g/10 min or more, preferably from 20 to 300 g/10 min, and more preferably from 60 to 200 g/10 min. When the MFR is less than 20 g/10 min, fluidity lowers and not preferred.

The MFR of the crystalline polypropylene polymer portion is an MFR after completion of the polymerization of the propylene homopolymer portion (which, however, may be copolymerized with a comonomer of an extremely small amount so as not to lose crystallinity, e.g., 0.5 wt % or less). The propylene homopolymer may be obtained by single-stage polymerization or multi-stage polymerization. In the case of multi-stage polymerization, the MFR is an MFR of the crystalline polypropylene polymer portion taken out of the final polymerization tank. The MFR can be adjusted by the addition of hydrogen in polymerization to control the molecular weight.

The MFR is as described above.

(b-2): Ethylene Content of Propylene/Ethylene Random Copolymer Portion (B2)

The ethylene content of propylene/ethylene random copolymer portion (B2) is from 20 to 70 wt %, preferably from 26 to 60 wt %, and especially preferably from 30 to 50 wt %. When the ethylene content of (B2) is less than 20 wt %, appearance failure due to voids is liable to occur and, further, the effect as the molding appearance modifier is low (flow mark appearance cannot be improved), while when the proportion exceeds 70 wt %, the modifier component is not liable to be homogeneously dispersed in the material to be modified in injecting molding the copolymer itself or the material added as the molding appearance modifier, so that not preferred.

The ethylene content in the propylene/ethylene random copolymer portion is a value measured according to the method described later.

(b-3): Intrinsic Viscosity $[\eta]_{copoly}$ of Propylene/Ethylene Random Copolymer Portion (B2)

The intrinsic viscosity $[\eta]_{copoly}$ of propylene/ethylene random copolymer portion (B2) is from 2.5 to 9.0 dl/g, preferably from 4.1 to 6.5 dl/g, and especially preferably from 4.5 to 6.0 dl/g. When the $[\eta]_{copoly}$ is less than 2.5 dl/g, flow mark appearance is inferior in injecting molding the modifier added, and when it exceeds 9.0 dl/g, the MFR of the whole of the propylene block copolymer lowers and disadvantage that the molding processability of the resin composition in injecting molding is inferior is accompanied.

The intrinsic viscosity $[\eta]_{copoly}$ of propylene/ethylene random copolymer portion is a value measured according to the method described later.

(b-4): (MFR$_B$) of Propylene/Ethylene Block Copolymer (B)

The melt flow rate (MFR$_B$) of the propylene/ethylene block copolymer (B) is from 0.1 to 50 g/10 min, preferably from 0.2 to 40 g/10 min, and more preferably from 2.1 to 40 g/10 min. When the (MFR$_B$) is less than 0.1 g/10 min, the molding processability as the resin composition in injection molding is inferior, while when it exceeds 40 g/10 min, the improvement of flow mark appearance is insufficient.

The MFR as used here is a value measured in conformity with JIS K7210 at 230° C. and a load of 21.18N.

2. Analysis Methods of Physical Properties of Propylene Block Copolymer

The ratio (Wc) of the propylene/ethylene random copolymer portion of the propylene block copolymers (A) and (B) ((A2) and (B2), hereinafter sometimes referred to as rubber components) for use in the invention, the ethylene content in the rubber component, and the intrinsic viscosity are measured with the apparatus and the conditions shown below according to the following procedures.

(1) Analysis Apparatus Used
(i) Apparatus for Cross Fractionation
CFC T-100 (manufactured by DIA Instruments Co., Ltd., hereinafter abbreviated to CFC)
(ii) Fourier transform infrared absorption spectrum analysis
FT-IR (1760×, manufactured by Perkin Elmer, Inc.)

The fixed wavelength infrared spectrophotometer installed as the detector of CFC is detached and FT-IR is connected in place of it, and the FT-IR is used as the detector. A transfer line from the outlet of the solution eluted from CFC to FT-IR is set at a length of 1 m and maintained at 140° C. throughout the measurement. The flow cell installed in FT-IR has an optical path length of 1 mm and an optical path width of 5 mmφ and the temperature is maintained at 140° C. throughout the measurement.

(iii) Gel permeation chromatography (GPC)

As the GPC column in the latter stage part of CFC, three columns of AD806MS manufactured by Showa Denko K.K. connected in series are used.

(2) Measurement Conditions of CFC
(i) Solvent: orthodichlorobenzene (ODCB)
(ii) Sample concentration: 4 mg/ml
(iii) Injection amount: 0.4 ml
(iv) Crystallization:
Temperature is lowered from 140° C. to about 40° C. over 40 minutes.
(v) Method of Fractionation:

The fractionation temperature at the time of temperature rising elution fractionation is set at 40, 100 and 140° C., and the sample is fractionated into three fractions in total. Elution ratios (unit: wt %) of a component eluted at 40° C. or less (fraction 1), a component eluted at from 40 to 100° C. (fraction 2), and a component eluted at from 100 to 140° C. (fraction 3) are defined as $W_{40}$, $W_{100}$, and $W_{140}$, respectively. $W_{40}+W_{100}+W_{140}=100$. The resulting fractions are each automatically transported to the FT-IR analysis apparatus as is.

(vi) Solvent flow rate at the time of elution: 1 ml/min
(3) Measurement Conditions of FT-IR After the elution of the sample solution is started from GPC of the latter stage of CFC, the FT-IR measurement is carried out on the following conditions, and GPC-IR data on the above respective fractions 1 to 3 are collected.
(i) Detector: MCT
(ii) Resolution: 8 cm$^{-1}$
(iii) Measurement interval: 0.2 min (12 sec)
(iv) Integrating frequency per one measurement: 15 times
(4) Post Treatment and Analysis of Measurement Results The elution amount and molecular weight distribution of the component eluted at each temperature are found with the absorbance at 2,945 cm$^{-1}$ obtained by FT-IR as a chromatogram. The elution amount is standardized such that the sum total of the elution amounts of the respective eluted components is 100%. The conversion from the retention volume to the molecular weight is performed with a calibration curve prepared in advance with standard polystyrene.

Standard polystyrenes used are the products having the following trade names manufactured by TOSO CORPORATION: F380, F288, F128, F80, F40, F20, F10, F4, F1, A5000, A2500 and A1000.

A calibration curve is prepared by injecting 0.4 ml of a solution obtained by dissolving each standard polystyrene in ODCB to give concentration of 0.5 mg/ml (containing 0.5 mg/ml of BHT). As the calibration curve, a cubic expression obtained by approximation by the least square method is employed. For the conversion to the molecular weight, a general purpose calibration curve is employed with reference to Sadao Mori, *Size Haijo Chromatography* (*Size Exclusion*

Chromatography), Kyoritsu Shuppan Co., Ltd. For the viscosity expression used herein ($[\eta]=K\times M^{\alpha}$), the following numerical values are used.

(i) At the time of preparation of calibration curve with standard polystyrene:

K=0.000138, α=0.70

(ii) At the time of measurement of sample of propylene block copolymer:

K=0.000103, α=0.78

The ethylene content distribution of each eluted component (the distribution of the ethylene content along the molecular weight axis) is found in terms of an ethylene content (wt %) from a calibration curve prepared in advance by using polyethylene, polypropylene, ethylene-propylene rubber (EPR) whose ethylene content is already known by $^{13}$C-NMR measurement or a mixture thereof while using the ratio of absorbance at 2,956 cm$^{-1}$ to absorbance at 2,927 cm$^{-1}$ obtained by FT-IR.

(5) Ratio (Wc) of Propylene/Ethylene Random Copolymer Portion

The ratio (Wc) of the propylene/ethylene random copolymer portion in the propylene block copolymer of the invention is defined by the following equation (I) in theory, and found by the procedures shown below.

$$Wc(\text{wt \%})=W_{40}\times A_{40}/B_{40}+W_{100}\times A_{100}/B_{100} \quad (I)$$

In the formula (I), $W_{40}$ and $W_{100}$ each represents an eluted proportion (unit: wt %) at each of the above fractions; $A_{40}$ and $A_{100}$ each represents an average ethylene content (unit: wt %) measured at each of the fractions corresponding to $W_{40}$ and $W_{100}$, respectively; and $B_{40}$ and $B_{100}$ each represents an ethylene content (unit: wt %) of the propylene/ethylene random copolymer portion contained in each of the fractions. These $A_{40}$, $A_{100}$, $B_{40}$ and $B_{100}$ are found in the manner described later.

The meaning of equation (I) is as follows. That is, the first term on the right side of equation (I) is a term for computing the amount of propylene/ethylene random copolymer portion contained in fraction 1 (the portion soluble at 40° C.). When fraction 1 contains a propylene/ethylene random copolymer alone and does not contain a propylene homopolymer, $W_{40}$ directly contributes to the content of the propylene/ethylene random copolymer portion derived from fraction 1 that accounts for in the whole. However, since fraction 1 also contains a small amount of components derived from the propylene homopolymer (a component having an extremely low molecular weight and atactic polypropylene) in addition to the component derived from the propylene.ethylene random copolymer, it is necessary to correct the components derived from the propylene homopolymer. Thus, the amount derived from the component of the propylene/ethylene random copolymer portion of fraction 1 is computed by multiplying $W_{40}$ by $A_{40}/B_{40}$. When the average ethylene content ($A_{40}$) of fraction 1 is 30 wt %, and the ethylene content ($B_{40}$) of the propylene/ethylene random copolymer contained in fraction 1 is 40 wt %, $^{30}/_{40}=^{3}/_{4}$ (i.e., 75 wt %) of fraction 1 is derived from the propylene/ethylene random copolymer, and ¼ is derived from the propylene homopolymer. The multiplying operation by $A_{40}/B_{40}$ in the first term on the right side means the computation of the contribution of the propylene/ethylene random copolymer from the wt % ($W_{40}$) of fraction 1. This is also applies to the second term on the right side. Accordingly, the sum of the contributions of the propylene/ethylene random copolymer of respective fractions is the content of the propylene/ethylene random copolymer portion.

(i) As described above, the average ethylene contents corresponding to fractions 1 and 2 obtained by the CFC measurement are expressed by $A_{40}$ and $A_{100}$, respectively (units are each wt %). The method of finding the average ethylene content is described later.

(ii) The ethylene content corresponding to the peak position in the differential molecular weight distribution curve of fraction 1 is designated as $B_{40}$ (unit: wt %). It is considered that all the rubber portion of fraction 2 is eluted at 40° C. and the ethylene content cannot be defined in the same manner, so that in the invention the ethylene content is defined as substantially $B_{100}$=100. The $B_{40}$ and $B_{100}$ each represents an ethylene content of the propylene/ethylene random copolymer portion contained in each fraction. It is substantially impossible to analytically find this value for the reason that there is no means for completely separating and recovering the propylene homopolymer and propylene/ethylene random copolymer existing as a mixture in the fraction. As a result of investigation using a variety of model samples, it has been found that, in connection with $B_{40}$, use of an ethylene content corresponding to the peak position of the differential molecular weight distribution curve of fraction 1 facilitates the explanation of an improving effect of the physical properties of the material. In addition, judging from two reasons that $B_{100}$ has crystallinity derived from the ethylene chain and the amount of the propylene/ethylene random copolymer contained in these fractions is relatively small as compared with the amount of the propylene/ethylene random copolymer portion contained in fraction 1, $B_{100}$ approximated to 100 is rather close to the actual state and hardly causes an error in the computation. Therefore, the analysis is performed on the assumption that $B_{100}$ equals 100.

(iii) From the above reasons, the ratio (Wc) of the propylene/ethylene random copolymer portion is found in accordance with the following equation.

$$Wc(\text{wt \%})=W_{40}\times A_{40}/B_{40}+W_{100}\times A_{100}/100 \quad (II)$$

That is, ($W_{40}\times A_{40}/B_{40}$) that is the first term on the right side of the equation (II) represents the content (wt %) of the propylene/ethylene random copolymer not having crystallinity, and ($W_{100}\times A_{100}/100$) that is the second term represents the content (wt %) of the propylene/ethylene random copolymer portion having crystallinity.

Here, $B_{40}$ and the average ethylene contents $A_{40}$ and $A_{100}$ of each of fractions 1 and 2 obtained by CFC measurement are found in the following manner.

An ethylene content corresponding to the peak position of the differential molecular weight distribution curve is $B_{40}$. In addition, the sum of the product of the weight percentage at every data point and the ethylene content at every data point, each taken in as a data point at the time of measurement becomes the average ethylene content $A_{40}$ of fraction 1. The average ethylene content $A_{100}$ of fraction 2 is also found in the same manner.

The meaning of setting three different fractionation temperatures is as follows. In the CFC analysis in the invention, 40° C. is a temperature condition necessary and sufficient for fractionating polymers not having crystallinity alone (for example, the majority of the propylene/ethylene random copolymer, or a component having an extremely low molecular weight and an atactic component in the propylene homopolymer portion), 100° C. is a temperature necessary and sufficient for eluting components insoluble at 40° C. but soluble at 100° C. alone (for example, a component having crystallinity ascribable to the ethylene and/or propylene chain in the propylene/ethylene random copolymer and propylene homopolymer having low crystallinity), and 140° C. is a temperature necessary and sufficient for eluting components insoluble at 100° C. but soluble at 140° C. alone (for example, a component having especially high crystallinity in the propylene homopolymer and a component having an extremely high molecular weight and extremely high ethylene crystallinity in the propylene/ethylene random copolymer) and recovering the whole amount of the propylene block copolymer for use in the analysis. Incidentally, since $W_{140}$ does not contain the propylene/ethylene random copolymer component at all or, if any, an extremely small amount substantially negligible, $W_{140}$ is excluded from the computation of the ratio of the propylene/ethylene random copolymer or the ethylene content of the propylene/ethylene random copolymer.

(6) Ethylene Content of Propylene/Ethylene Random Copolymer Portion

The ethylene content of the propylene/ethylene random copolymer portion in the propylene block copolymer in the invention can be found according to the following equation with the values explained above.

$$\text{Ethylene content(wt \%) of propylene/ethylene random copolymer portion} = (W_{40} \times A_{40} + W_{100} \times A_{100})/Wc$$

In the equation, Wc represents the ratio (wt %) of the propylene/ethylene random copolymer portion found above.

(7) Measurement of Intrinsic Viscosity

The intrinsic viscosities $[\eta]_{homo}$ and $[\eta]_{copoly}$ of the crystalline propylene polymer portion and propylene/ethylene random copolymer portion in the propylene block copolymer of the invention are measured at 135° C. with a Ubbelohde's viscometer by using decalin as the solvent.

After termination of polymerization of the crystalline propylene polymer portion, a part of the polymer is sampled from the polymerization tank and the intrinsic viscosity $[\eta]_{homo}$ is measured. In the next place, after polymerization of the crystalline propylene polymer portion, the intrinsic viscosity $[\eta]_F$ of the final polymer (F) obtained by the polymerization of the propylene/ethylene random copolymer is measured. The $[\eta]_{copoly}$ is found from the following relationship:

$$[\eta]_F = (100 - Wc)/100 \times [\eta]_{homo} + Wc/100 \times [\eta]_{copoly}$$

3. Manufacturing Method of Propylene Block Copolymer

Component (A) and component (B) of the propylene block copolymer used as a moldability modifier of the invention are both reaction mixtures of the crystalline propylene polymer portion and the propylene/ethylene random copolymer portion. They can be obtained in accordance with a manufacturing process comprising the polymerization (the former stage) of a propylene homopolymer portion that is a crystalline propylene polymer portion and the subsequent polymerization (the latter stage) of a propylene/ethylene random copolymer portion.

The crystalline propylene polymer is manufactured by a single-stage or multistage polymerization step (reaction conditions of the respective stages may be the same or different), while the propylene/ethylene random copolymer portion is also manufactured by a single stage or multistage polymerization step (reaction conditions of the respective stages may be the same or different). Accordingly, the entire manufacturing process of the propylene block copolymer of the invention comprises a successive multistage polymerization step having at least two stages.

The catalysts for use in the above polymerization are not especially restricted, and any of known catalysts, e.g., what is called Ziegler Natta catalysts using an organic aluminum compound component and a solid component composed essentially of a titanium atom, magnesium atom, halogen atom and an electron donative compound in combination, and metallocene catalysts can be used. Of these catalysts, since a rubber component having a higher intrinsic viscosity has the higher effects of molding appearance improvement when added as a modifier, Ziegler Natta catalysts causing less chain transfer during polymerization are usually preferably used.

As the systems of polymerization, slurry polymerization using inert hydrocarbon, e.g., hexane, heptane, octane, benzene or toluene, as the polymerization solvent, vapor phase polymerization of performing polymerization of material propylene in a vapor phase state, and bulk polymerization with propylene itself as the polymerization solvent can be used. Any of a batch system, a continuous system and a semi-batch system can be used.

The propylene block copolymer component (A) in the invention is characterized in that the melt flow rate of the propylene homopolymer portion is high, so that it is preferred to perform polymerization according to slurry polymerization or vapor phase polymerization capable of operation in high hydrogen concentration. On the other hand, the propylene block copolymer component (B) is characterized in that the rubber content is high, so that manufacturing by slurry polymerization is impossible due to elution of the rubber into the solvent, therefore, vapor phase polymerization or hybrid polymerization by the first stage bulk or the second stage vapor phase is preferred.

As the reactors for polymerization, the form and structure are not especially restricted, and a tank with a stirrer and a tube type reactor ordinarily used in slurry polymerization and bulk polymerization, a fluidized bed reactor and a horizontal reactor with a stirring blades ordinarily used in vapor phase polymerization are exemplified.

In slurry polymerization, in the above successive multistage polymerization step having at least two stages, homopolymerization of propylene is performed in the former stage polymerization step by feeding hydrogen as a chain transfer agent in the presence of the above catalyst at a temperature of from 50 to 100° C., preferably at from 60 to 80° C., at a partial pressure of propylene of from 0.15 to 2.0 MPa, preferably from 0.15 to 1.0 MPa, and residence time of from 2 to 10 hours, preferably from 2 to 5 hours, whereby a crystalline propylene polymer portion is prepared. The crystalline propylene polymer portion may be copolymerized with an α-olefin other than propylene without impairing the advantage of the invention. Further, in the propylene block copolymer component (A) of the invention, the MFR of the crystalline propylene polymer portion is high, so that it is necessary to control hydrogen as the chain transfer agent to relatively high concentration, although it depends upon the kind of the catalyst.

Subsequently, random copolymerization of propylene and ethylene is performed to manufacture a propylene/ethylene random copolymer portion in the latter stage polymerization step by feeding propylene, ethylene and hydrogen in the presence of the catalyst (the catalyst used in the first stage polymerization step) at a temperature of from 40 to 80° C., preferably from 50 to 80° C., and at a partial pressure of propylene and ethylene of from 0.10 to 1.0 MPa, preferably from 0.10 to 0.5 MPa, whereby a propylene block copolymer is obtained as a final product. The propylene/ethylene random copolymer portion may be copolymerized with an α-olefin other than propylene and ethylene without impairing the advantage of the invention. Further, since the intrinsic viscosity $[\eta]_{copoly}$ of the propylene/ethylene random copolymer portion is high in the propylene block copolymer component (A) of the invention, it is necessary to control $[\eta]_{copoly}$ by adjusting the concentration of hydrogen as the chain transfer agent to as low as possible, although it depends upon the process and the kind of the catalyst. In addition, to maintain the ethylene content in the propylene/ethylene random copolymer portion (the rubber component) in a specific range, the ethylene concentration to the propylene concentration in the latter stage is adjusted.

In vapor phase polymerization and bulk polymerization, polymerization is carried out, in the former stage polymerization step, on the conditions of a temperature of from 50 to 150° C., preferably from 50 to 70° C., and at a partial pressure of propylene of from 0.5 to 4.5 MPa, preferably from 1.0 to 3.0 MPa. In the latter stage polymerization step, random copolymerization of propylene and ethylene is carried out on the conditions of a temperature of from 50 to 150° C., preferably from 50 to 90° C., and at a partial pressure of propylene and ethylene of from 0.3 to 4.5 MPa, preferably from 0.5 to 3.5 MPa.

The propylene block copolymer component (B) of the invention is characterized in that the proportion of the propylene/ethylene random copolymer portion (the rubber component) is high, so that, for capable of maintaining high catalytic activity in the polymerization of the rubber component in the latter stage, it is preferred in the polymerization in the former stage to use conditions of a low polymerization temperature and a low partial pressure of propylene and a shorter polymerization time to suppress the catalytic activity. Further, in the rubber polymerization of the latter stage also, the conditions of making the catalytic activity high (conditions of a high polymerization temperature and a high partial pressure of propylene and ethylene, and long polymerization time) are preferred. However, since the fluidity of powder particles is worsened when polymerization temperature is too high, a relatively low temperature is preferred for maintaining good powder particle fluidity.

Further, irrespective of slurry, vapor phase and bulk polymerizations, for the purpose of giving fluidity to the powder particles of the composition prepared in the multistage polymerization step having at least two successive stages and preventing gelation that is dispersion failure of rubber of the copolymer, it is preferred to add a compound containing active hydrogen in an amount of from 0.2 to 2 times the mol of the organic aluminum compound serving as the catalyst after polymerization in the former stage polymerization step and prior to initiation of polymerization in the latter polymerization step, or during the polymerization.

As the examples of the active hydrogen-containing compounds, e.g., water, alcohols, phenols, aldehydes, carboxylic acids, acid amides, ammonia and amines are exemplified.

4. Composition Ratio of Component (A) and Component (B)

The moldability modifier in the invention is a mixture of component (A) and component (B). For exhibiting the advantage of the invention, the ratio (weight ratio) of component (A) and component (B), component (A)/component (B), is from 19/1 to 1/19, preferably from 4/1 to 1/4, and more preferably from 3/1 to 1/3. When the ratio of component (A) is too high, an appearance failure due to voids is liable to occur, while when the ratio of component (B) is too high, the flexural modulus lowers and not preferred.

The moldability modifier in the invention may contain, in the range of not conspicuously impairing the advantage of the invention, an antioxidant, a heat resisting stabilizer, a weather-proofing stabilizer, an ultraviolet absorber, a nucleating agent, a dispersant, a pigment, an antistatic agent, a lubricant, a metal deactivator and the like.

[II] Polypropylene Resin Composition

The polypropylene resin composition excellent in molding appearance of the invention is a polypropylene resin composition that can be obtained by blending propylene block copolymer of the moldability modifier with general purpose polypropylene resin material to be modified as the third component, which is a polypropylene resin composition capable of modifying the appearance of molding typified by flow marks and voids, and little in physical variation due to molding.

In the polypropylene resin composition excellent in molding appearance of the invention, the moldability modifier comprising component (A) and component (B) is blended with a polypropylene resin material to be modified in an amount of from 2 to 30 weight parts, preferably from 2 to 25 weight parts, and more preferably from 3 to 18 weight parts. In particular, since it is essential to control molding appearance while maintaining physical properties in a case of using the moldability modifier by separate addition, it is required that the rate of change in physical properties before and after addition is little. Accordingly, when use amount exceeds 30 weight parts, the rate of change in physical properties becomes ±25% or more, and so not preferred.

As the polypropylene resin materials to be modified, a polypropylene resin composition containing (C) propylene/ethylene block copolymer is preferred, and further according to necessity, a polypropylene resin composition containing (D) an inorganic filler, and/or (E) an ethylene elastomer or styrene elastomer can be exemplified. Each component constituting the polypropylene resin composition excellent in molding appearance of the invention will be described in detail below.

1. Each Component of Polypropylene Resin Composition Excellent in Molding Appearance (1) Moldability Modifier The moldability modifier for use in the polypropylene resin composition excellent in molding appearance of the invention is a mixture of a propylene block copolymer comprising component (A) and component (B).

(2) Polypropylene Resin Material to be Modified

Component (C): Propylene/ethylene block copolymer

The propylene/ethylene block copolymer (C) for use in the polypropylene resin composition excellent in molding appearance of the invention is preferably a block copolymer containing crystalline polypropylene polymer portion (C1) and ethylene/propylene random copolymer portion (C2).

Crystalline polypropylene polymer portion (C1) is a crystalline polymer obtained generally by homopolymerization of propylene and, according to cases, propylene may be copolymerized with a small amount of α-olefin, and the density is preferably high. The crystallinity of (C1) is generally 90% or more as an isotactic index (the insoluble content by extraction with boiling n-heptane), and preferably from 95 to 100%. When the crystallinity is insufficient, the mechanical strength of component (C), in particular, flexural modulus is inferior. On the other hand, ethylene/propylene random copolymer portion (C2) is a rubber-like component obtained by random copolymerization of propylene and ethylene.

The proportion of (C1) is adjusted to generally account for from 50 to 85 wt % of all the polymer amount, preferably from 60 to 82 wt %, and more preferably from 70 to 81 wt %, and (C2) to generally account for from 15 to 50 wt % of all the polymer amount, preferably from 18 to 40 wt %, and more preferably from 19 to 37 wt %.

In extraction with orthodichlorobenzene, elution of (C1) does not occur at 100° C. or less, but elution of (C2) easily occurs as described above. Accordingly, by the extraction analysis using the orthodichlorobenzene, the composition of propylene/ethylene block copolymer (C) in the polymer after manufacture can be judged.

The rubber content of the polypropylene resin material to be modified (C) for use in the invention extracted with the orthodichlorobenzene is preferably 10 wt % or more, and more preferably 15 wt %.

Propylene/ethylene block copolymer (C) for use in the polypropylene resin composition excellent in molding appearance of the invention has an MFR of preferably from 10 to 200 g/10 min, and more preferably from 15 to 150 g/10 min. When the MFR is less than 10 g/10 min, the resin composition is inferior in moldability, while when it exceeds 200 g/10 min, impact resistance lowers, and so not preferred.

For the manufacture of component (C), a method of polymerization using catalysts having high stereoregularity is preferably used. As the polymerization method, any of conventionally known methods can be used. As the catalyst and polymerization method, the similar methods as used in the above manufacture of the moldability modifier of the propylene block copolymer are used. In the manufacture of component (C) abundant in propylene/ethylene random copolymer portion (C2), a gaseous phase fluidized bed method is especially preferably used. In the latter stage reaction, further addition of an electron donative compound can prevent the occurrence of troubles such as adhesion and choking and improve the operation property of polymerization.

Component (D): Inorganic Filler

In the polypropylene resin composition excellent in molding appearance of the invention, inorganic filler (D) can be blended according to necessity. Component (D) is used for the purpose of improvement of the flexural modulus and reduction of the linear expansion coefficient of the polypropylene resin composition.

The composition and form of the inorganic filler (D) that can be used in the invention are not especially restricted. Any commercially available filler for polymers can be used.

The specific examples of the inorganic fillers include plate-like inorganic fillers, e.g., talc, mica, montmorillonite and the like, fibrous inorganic fillers, e.g., short fiber glass fibers, long fiber glass fibers, carbon fibers, Aramid fibers, alumina fibers, boron fibers, xonotlite and the like, whisker-like inorganic fillers, e.g., potassium titanate, magnesium oxysulfate, silicon nitride aluminum borate, basic magnesium sulfate, zinc oxide, wollastonite, calcium carbonate and the like, granular inorganic fillers, e.g., precipitated calcium carbonate, calcium bicarbonate, magnesium carbonate and the like, and balloon-like inorganic fillers, e.g., glass balloon. Of these inorganic fillers, talc is especially preferred from the standpoint of the balance of physical properties and cost.

Talcs having been surface-treated with any of various organic titanate coupling agents, organosilane coupling agents, modified polyolefins obtained by grafting an unsaturated carboxylic acid or anhydride thereof, fatty acids, metal salts of a fatty acid, and fatty acid esters may be used for the purpose of improving adhesion with a polymer or dispersibility.

Component (E): Ethylene Elastomer or Styrene Elastomer

An ethylene elastomer or styrene elastomer (E) can be blended with the polypropylene resin composition of the invention, if necessary. The specific examples of the ethylene elastomer or styrene elastomer (E) that can be used in the invention include ethylene/α-olefin copolymer elastomers, e.g., ethylene/propylene copolymer elastomer (EPR), ethylene/butane copolymer elastomer (EBR), ethylene/hexene copolymer elastomer (EHR), ethylene/octene copolymer elastomer (EOR) and the like; ethylene/α-olefin/diene terpolymer elastomer (EPDM), e.g., ethylene/propylene/ethylidenenorbornene copolymer elastomer, ethylene/propylene/butadiene copolymer elastomer, ethylene/propylene/ isoprene copolymer elastomer and the like; and styrene elastomers, e.g., styrene/butadiene/styrene triblock copolymer (SBS), styrene/isoprene/styrene triblock copolymer (SIS), hydrogenated styrene/butadiene/styrene triblock copolymer (SEBS), hydrogenated styrene/isoprene/styrene triblock copolymer (SEPS) and the like.

The above-described hydrogenated styrene/butadiene/styrene triblock copolymer is a styrene/ethylene/butene/styrene block copolymer when its polymer main chain is considered from the aspect of a monomer unit, so that it is usually abbreviated as SEBS.

These ethylene elastomer and styrene elastomer (E) can be used as a mixture of two or more kinds.

The ethylene/α-olefin copolymer elastomer is manufactured by the polymerization of each monomer in the presence of a catalyst. The examples of the catalysts include titanium compounds such as titanium halide, organic aluminum-magnesium complexes such as alkylaluminum-magnesium complexes, what is called Ziegler catalysts such as alkylaluminums and alkylaluminum chlorides, and metallocene compound catalysts as those disclosed in WO 91/04257. As the polymerization method, a gaseous phase fluidized bed method, a solution method and a slurry method can be used. The examples of commercially available products include ED Series manufactured by JSR Corporation, TAFMER P series and TAFMER A series, manufactured by Mitsui Chemicals, Engage EG series manufactured by Du Pont Dow, and Tuftec H series manufactured by Asahi Kasei Corporation, and any of these compounds can be used in the invention.

The manufacturing method of the hydrogenated triblock copolymer (SEBS, SEPS) as the styrene elastomer will be outlined below. Such a triblock copolymer can be manufactured by an ordinary anion living polymerization method. According to the method, the hydrogenated triblock copolymer can be manufactured by the polymerization of styrene, butadiene and styrene successively into a corresponding triblock copolymer and then hydrogenating the resulting product (manufacturing method of SEBS), or by manufacturing a diblock copolymer of styrene and butadiene first, followed by hydrogenation to the triblock copolymer with a coupling agent. A hydrogenated styrene/isoprene/styrene triblock copolymer (SEPS) can also be manufactured in a similar manner except for using isoprene instead of butadiene.

The ethylene elastomer or styrene elastomer (E) to be used in the polypropylene resin composition of the invention has an MFR (measured at 230° C. under a load of 2.16 kg) of preferably from 0.5 to 150 g/10 min, more preferably from 0.7 to 150 g/10 min, and especially preferably from 0.7 to 80 g/10 min. In consideration of an automobile exterior material that is a principal use of the polypropylene resin composition of the invention excellent in molding appearance, elastomers having an MFR in the above range are especially preferred.

(F) Additional Components (Optional Components)

In the polypropylene resin composition of the invention, components (optional components) other than the above components (A) to (D) can further be used in the range not conspicuously impairing the advantage of the invention. The examples of such additional components (optional components) include phenolic and phosphorous antioxidants, weather-proofing deterioration preventives, e.g., hindered amine, benzophenone, and benzotriazole compounds, nucleating agents, e.g., organoaluminum compounds and organophosphorous compounds, dispersants typified by metal salts of stearic acid, and coloring substances, e.g., quinacridone, perylene, phthalocyanine, titanium oxide, and carbon black.

2. Components of the Polypropylene Resin Composition

The polypropylene resin composition of the invention can be obtained by combination of the moldability modifier comprising (A) and (B), and component (C), and if necessary, (D) and (E). The compositional ratios in representative combinations are as follows.

(1) Polypropylene Resin Composition Comprising Components (A) and (B), and Component (C)

The polypropylene resin composition comprising (A) and (B), and (C) contains moldability modifier comprising (A) and (B) in an amount of from 2 to 30 weight parts, preferably from 2 to 25 weight parts, and more preferably from 3 to 18 weight parts, based on 100 weight parts of ethylene/propylene block copolymer (C). When the amount of moldability modifier comprising (A) and (B) is less than 2 weight parts, the molding appearance modifying effect is inferior, while when the amount exceeds 30 weight parts, the impact resistance lowers.

(2) Polypropylene Resin Composition Comprising Components (A) and (B), and Components (C) and (D)

The polypropylene resin composition comprising (A) and (B), and (C) and (D) contains moldability modifier comprising (A) and (B) in an amount of from 2 to 30 weight parts, preferably from 2 to 25 weight parts, and more preferably from 3 to 18 weight parts, based on 100 weight parts in total of components (C) and (D). In connection with the proportions of components (C) and (D), the proportion of component (C) is from 65 to 99 wt %, preferably from 70 to 98 wt %, more preferably from 75 to 98 wt %, and especially preferably from 80 to 97 wt %; and that of component (D) is from 1 to 35 wt %, preferably from 2 to 30 wt %, more preferably from 2 to 25 wt %, and especially preferably from 3 to 20 wt. When the proportion of component (D) is less than 1 wt %, the addition effect is not sufficiently exhibited and the flexural modulus of the resulting composition is insufficient, while when the proportion exceeds 35 wt %, the brittle temperature is deteriorated and moldability also lowers.

(3) Polypropylene Resin Composition Comprising Components (A) and (B), and Components (C) and (E).

The polypropylene resin composition comprising components (A) and (B), and (C) and (E) contains the moldability modifier comprising components (A) and (B) in an amount of from 2 to 30 weight parts, preferably from 2 to 25 weight parts, and more preferably from 3 to 18 weight parts, based on the 100 weight parts in total of components (C) and (E). In connection with the proportions of components (C) and (E), the proportion of component (C) is from 65 to 99 wt %, preferably from 70 to 98 wt %, more preferably from 75 to 98 wt %, and especially preferably from 83 to 97 wt %; and the proportion of component (E) is from 1 to 35 wt %, preferably from 2 to 30 wt %, more preferably from 2 to 25 wt %, and especially preferably from 3 to 17 wt %. When the proportion of component (E) is less than 1 wt %, the addition effect is not sufficiently exhibited. On the other hand, when the proportions exceeds 35 wt %, there are possibilities of the reduction in rigidity and the increment in costs. However, the compositions of these components vary with the use purpose or application, and they are not restricted to the above examples and are different by the kind of elastomers. Therefore, it is important to select proper compositions depending upon the application or use purpose.

(4) Polypropylene Resin Composition Comprising Components (A) and (B), and Components (C), (D) and (E)

The polypropylene resin composition comprising components (A) and (B), and (C), (D) and (E) contains the moldability modifier comprising (A) and (B) in an amount of from 2 to 30 weight parts, preferably from 2 to 25 weight parts, and more preferably from 3 to 18 weight parts, based on 100 weight parts in total of components (C), (D) and (E). In connection with the proportions of component (C), component (D), and component (E), the proportion of component (C) is from 40 to 98 wt %, preferably from 47 to 96 wt %, and more preferably from 50 to 92 wt %; the proportion of component (D) is from 1 to 40 wt %, preferably from 2 to 35 wt %, and more preferably from 4 to 32 wt %; and the proportion of component (E) is from 1 to 20 wt %, preferably from 2 to 15 wt %, and more preferably from 4 to 12 wt %.

3. Manufacture and Characteristics of Polypropylene Resin Composition

The polypropylene resin composition in the invention can be manufactured by kneading the above constitutional components in the above proportions in an ordinary kneader such as an extruder, e.g., a single screw extruder or twin screw extruder, or a kneader, e.g., Banbury mixer, roll, Brabender Plastograph, or kneader, at prescribed temperature of from 180 to 250° C. Of these kneaders, an extruder, especially a twin screw extruder is preferred for the manufacture of the polypropylene resin composition.

In the polypropylene resin composition excellent in molding appearance of the invention, when the moldability modifier is blended with the polypropylene resin material to be modified, the rate of change of MFR, flexural modulus, and IZOD impact strength at −30° C. is preferably less than ±25%. Further, the polypropylene resin composition has an MFR of preferably 10 g/10 min or more, and an IZOD impact strength at −30° C. of preferably 3 kg/cm$^2$ or more.

Herein, MFR, flexural modulus, and IZOD impact strength at −30° C. are respectively the values measured in conformity with ASTM-D1238 (load: 2.16 kg, 230° C.), JIS K7203, and JIS K7110.

4. Molding Process of Polypropylene Resin Composition

The polypropylene resin composition in the invention is processed to a desired molding. The method of molding is not especially restricted, and various molding methods can be used in molding according to purposes. For example, injection molding or extrusion method can be used, and when the polypropylene resin composition is used in a large sized injection molding method, the polypropylene resin composition exhibits excellent molding processability, flow mark characteristic, and weld appearance and thus shows great effects. Accordingly, the polypropylene resin composition of the invention is suitable for use in automobile exterior parts including bumper, rocker mogol, side mogol and over fender.

EXAMPLE

The invention will be described more specifically with reference to examples, but the invention is not restricted thereto without departing from the spirit and scope thereof.

The measuring methods of physical properties used in the examples and the manufacture examples of resins are as shown below.

1. Measuring Method of Physical Properties (1) Melt flow rate (MFR): It was measured at a temperature of 230° C. under a load of 2.16 kg in conformity with ASTM-D1238, and graded according to the following criteria.

◯: The rate of change from the standard material to be modified is less than 25%.

x: The rate of change from the standard material to be modified is 25% or more.

(2) IZOD impact strength: It was measured at −30° C. by using a notched specimen in conformity with JIS K7110 and graded according to the following criteria.

◯: The rate of change from the standard material to be modified is less than 25%.
x: The rate of change from the standard material to be modified is 25% or more.
(3) Flexural modulus: It was measured at 23° C. and flexural speed of 2 mm/min in conformity with JIS K-7203 and graded according to the following criteria.
◯: The rate of change from the standard material to be modified is less than 25%.
x: The rate of change from the standard material to be modified is 25% or more.
(4) Distance to flow mark generated on molding: By using an injection molding machine having a clamping pressure of 170 tons and a mold having a film gate of 2 mm wide on a short side, a sheet of 350 mm×100 mm×2 mm thickness was injection molded at a molding temperature of 220° C. Generation of flow marks was visually observed, and a distance from the gate to the position where a flow mark appeared was measured, and graded according to the following criteria.
◯: 100 mm or more.
x: Less than 100 mm.
(5) Void characteristics: By using an injection molding machine having a clamping pressure of 170 tons and a mold having a film gate of 2 mm wide on a short side, a sheet of 350 mm×100 mm×4 mm thickness was injection molded at a molding temperature of 220° C. Generation of rimple-like failure due to voids was visually observed, and graded according to the following criteria.
◯: the number of voids is less than 15.
x: the number of voids is 15 or more.
2. Propylene Block Copolymer Components (A) and (B)

Propylene block copolymers prepared in the following Manufacture Examples 1 to 8 were used as the moldability modifiers of components (A) (Modifiers 11 to 18), and the propylene block copolymers produced in Manufacture Examples 9 to 14 were used as the moldability modifiers of components (B) (Modifiers 21 to 26). The reaction conditions of each polymerization step, and indexes of the crystalline propylene polymers and propylene/ethylene random copolymers obtained are shown in Tables 1 and 2 below.

Manufacture Example 1

(i) Manufacture of Solid Catalyst Component (a)

Into a tank thoroughly purged with nitrogen having an internal volume of 50 liters and equipped with a stirrer was introduced 20 liters of dehydrated and deoxygenated n-heptane, and then 10 mols of $MgCl_2$ and 20 mols of $Ti(O-n-C_4H_9)_4$ were introduced, and they were reacted at 95° C. for 2 hours. After termination of the reaction, the temperature was lowered to 40° C. Reaction was carried out for 3 hours after introduction of 12 liters of methylhydropolysiloxane (20 centistokes). A solid component formed was washed with n-heptane.

In the next place, 5 liters of n-heptane refined in the same manner as above was introduced into the tank equipped with a stirrer, and 3 mols in terms of Mg atom of the solid component prepared above was introduced thereto. After 2.5 liters of n-heptane was mixed with 5 mols of $SiCl_4$, the resulting mixture was introduced into the flask at 30° C. over 30 minutes, and the reaction was performed at 70° C. for 3 hours. After termination of the reaction, the resulting reaction product was washed with n-heptane.

After 2.5 liters of n-heptane was introduced into the above tank equipped with a stirrer, 0.3 mols of phthalic chloride was introduced thereto at 70° C. over 30 minutes, and the resulting mixture was reacted at 90° C. for 1 hour. After termination of the reaction, the reaction mixture was washed with n-heptane. Subsequently, 2 liters of $TiCl_4$ was introduced, followed by reaction at 110° C. for 3 hours. After termination of the reaction, the reaction mixture was washed with n-heptane, whereby solid component (a1) for manufacturing component (a) was obtained. The titanium content of the solid component was 2.0 wt %.

In the next place, 8 liters of n-heptane, 400 g of solid component (a1) synthesized above, and 0.6 liters of $SiCl_4$ as component (a2) were introduced to the tank having a stirrer purged with nitrogen, followed by reaction at 90° C. for 2 hours. After termination of the reaction, 0.54 mols of $(CH_2=CH)Si(CH_3)_3$ as component (a3), 0.27 mols of $(t-C_4H_9)(CH_3)Si(OCH_3)_2$ as component (a4), and 1.5 mols of $Al(C_2H_5)_3$ as component (a5) were further successively introduced to the tank, and they were brought into contact with each other at 30° C. for 2 hours. After termination of the contact, the reaction mixture was thoroughly washed with n-heptane to thereby obtain 390 g of component (a) mainly comprising magnesium chloride. The titanium content of component (a) was 1.8 wt %.

(ii) Manufacture of Propylene/Ethylene Block Copolymer

After a stainless steel autoclave equipped with a stirrer having an internal volume of 400 liters was thoroughly purged with propylene gas, 120 liters of dehydrated and deoxygenated n-heptane was put in the autoclave as the polymerization solvent. Under the condition of temperature of 70° C., 30 g of triethylaluminum, 100 liters of hydrogen, and 20 g of the catalyst a were put in the autoclave. After the inner temperature of the autoclave was raised to 75° C., propylene was fed at a rate of 15.7 kg/hr and at the same time hydrogen was fed at a rate of 101 liter/hr, thus polymerization was initiated. The introduction of propylene and hydrogen was stopped after 250 minutes. The pressure was 0.16 MPa at the time of polymerization initiation, and increased with the passage of time during the feeding of propylene until 0.40 MPa at the point of time of feeding stopping. After that, unconverted gas in the reactor was discharged until 0.13 MPa to obtain crystalline propylene polymer portion (the former stage polymerization step).

After setting the inner temperature of the autoclave at 65° C., 12.5 cc of n-butanol was introduced, and ethylene was fed at a rate of 2.9 kg/hr and at the same time propylene was fed at a rate of 6.8 kg/hr. The feeding of ethylene and propylene was stopped after 60 minutes, and the pressure was increased with the passage of time during the feeding of the monomers until 0.22 MPa at the point of time of stopping of feeding (the latter stage polymerization step).

The obtained slurry was transferred to the next tank equipped with a stirrer, 2.5 liters of butanol was added thereto, and the slurry was treated at 70° C. for 3 hours, and further transferred to the next tank equipped with a stirrer, 100 liters of pure water having dissolved therein 20 g of sodium hydroxide was added to the tank, treated for 1 hour, and after allowing the slurry to stand, an aqueous layer was separated, and the catalyst residue was removed. The slurry was treated with a centrifugal separator to remove heptane, and then treated with a drier at 80° C. for 3 hours to thoroughly remove heptane, whereby 57.1 kg of Modifier 11 was obtained.

Manufacture Example 2

After a stainless steel autoclave equipped with a stirrer having an internal volume of 400 liters was thoroughly purged with a propylene gas, 120 liters of dehydrated and deoxygenated n-heptane was introduced as the polymerization solvent. Under the condition of temperature of 70° C., 30 g of triethylaluminum, 90 liters of hydrogen, and 15 g of the catalyst a were put in the autoclave. After the inner temperature of the autoclave was raised to 75° C., propylene was fed at a rate of 20.25 kg/hr and at the same time hydrogen was fed at a rate of 202 liter/hr, thus polymerization was initiated. The introduction of propylene and hydrogen was stopped after 200 minutes. The pressure was 0.15 MPa at the time of polymerization initiation, and increased with the passage of time during the feeding of propylene until 0.76 MPa at the point of time of stopping of feeding. After that, unconverted gas in the reactor was discharged until 0.13 MPa to obtain crystalline propylene polymer portion (the former stage polymerization step).

After setting the inner temperature of the autoclave at 65° C., 12.5 cc of n-butanol was introduced, and ethylene was fed at a rate of 3.75 kg/hr and at the same time propylene was fed at a rate of 3.8 kg/hr. The feeding of ethylene and propylene was stopped after 140 minutes, and the pressure was increased with the passage of time during the feeding of the monomers until 0.12 MPa at the point of time of stopping of feeding (the latter stage polymerization step).

The obtained slurry was subjected to post treatment in the same manner as in Manufacture Example 1, and 58.3 kg of Modifier 12 was obtained.

Manufacture Example 3

Modifier 13 was manufactured in the same manner as in Manufacture Example 1, except for changing the feeding rate of propylene to 15.3 kg/hr, and the feeding rate of hydrogen to 97 liter/hr in the former stage polymerization step, and in the latter stage polymerization step, the feeding rate of ethylene to 3.4 kg/hr, and the feeding rate of propylene to 7.9 kg/hr. The pressure in the former stage polymerization step was 0.15 MPa at the time of polymerization initiation, 0.40 MPa at the point of time of stopping of propylene feeding, and the pressure in the latter stage polymerization step was 0.24 MPa at the time of stopping of monomer feeding. The yield was 55.2 kg.

Manufacture Example 4

Modifier 14 was manufactured in the same manner as in Manufacture Example 2, except for changing the feeding rate of hydrogen in the former stage polymerization step to 172 liter/hr, and in the latter stage polymerization step, the feeding rate of ethylene to 0.96 kg/hr, and the feeding rate of propylene to 2.25 kg/hr. The pressure in the former stage polymerization step was 0.15 MPa at the time of polymerization initiation, 0.71 MPa at the point of time of stopping of propylene feeding, and the pressure in the latter stage polymerization step was 0.12 MPa at the time of stopping of monomer feeding. The yield was 60.5 kg.

Manufacture Example 5

After a stainless steel autoclave equipped with a stirrer having an internal volume of 200 liters was thoroughly purged with a propylene gas, 60 liters of dehydrated and deoxygenated n-heptane was introduced as the polymerization solvent. Under the condition of temperature of 70° C., 15 g of triethylaluminum, 50 liters of hydrogen, and 8 g of the catalyst a were put in the autoclave. After the inner temperature of the autoclave was raised to 75° C., propylene was fed at a rate of 10.1 kg/hr and at the same time hydrogen was fed at a rate of 71 liter/hr, thus polymerization was initiated. The introduction of propylene and hydrogen was stopped after 200 minutes. The pressure was 0.15 MPa at the time of polymerization initiation, and increased with the passage of time during the feeding of propylene until 0.53 MPa at the point of time of stopping of feeding. After that, unconverted gas in the reactor was discharged until 0.13 MPa to obtain crystalline propylene polymer portion (the former stage polymerization step).

After setting the inner temperature of the autoclave at 65° C., 6.3 cc of n-butanol was introduced, and ethylene was fed at a rate of 0.64 kg/hr and at the same time propylene was fed at a rate of 0.96 kg/hr. The feeding of ethylene and propylene was stopped after 140 minutes, and the pressure was increased with the passage of time during the feeding of the monomers until 0.13 MPa at the point of time of stopping of feeding (the latter stage polymerization step).

The obtained slurry was subjected to post treatment in the same manner as in Manufacture Example 1, and 27.3 kg of Modifier 15 was obtained.

Manufacture Example 6

After a stainless steel autoclave equipped with a stirrer having an internal volume of 400 liters was thoroughly purged with a propylene gas, 120 liters of dehydrated and deoxygenated n-heptane was introduced as the polymerization solvent. Under the condition of temperature of 70° C., 30 g of triethylaluminum, 90 liters of hydrogen, and 20 g of the catalyst a were put in the autoclave. After the inner temperature of the autoclave was raised to 75° C., propylene was fed at a rate of 20.25 kg/hr and at the same time hydrogen was fed at a rate of 121.5 liter/hr, thus polymerization was initiated. The introduction of propylene and hydrogen was stopped after 200 minutes. The pressure was 0.15 MPa at the time of polymerization initiation, and increased with the passage of time during the feeding of propylene until 0.46 MPa at the point of time of stopping of feeding. After that, unconverted gas in the reactor was discharged until 0.13 MPa.

The obtained slurry was subjected to post treatment in the same manner as in Manufacture Example 1, and 56.2 kg of Modifier 16 was obtained.

Manufacture Example 7

(i) Manufacture of Solid Catalyst Component (b)

Into a tank thoroughly purged with nitrogen having an internal volume of 50 liters and equipped with a stirrer was introduced 20 liters of dehydrated and deoxygenated n-heptane, and then 10 mols of magnesium chloride and 20 mols of tetrabutoxy titanium were introduced, and they were reacted at 95° C. for 2 hours. After termination of the reaction, the temperature was lowered to 40° C. Reaction was carried out for further 3 hours after introduction of 12 liters of methylhydropolysiloxane (viscosity: 20 centistokes). The reaction solution was then taken out from the tank and a solid component formed was washed with n-heptane.

Subsequently, 5 liters of dehydrated and deoxygenated n-heptane was introduced into the tank equipped with a stirrer, and then 3 mols in terms of magnesium atom of the solid component prepared above was introduced thereto. After 2.5 liters of n-heptane was mixed with 5 mols of silicon tetrachloride, the resulting mixture was introduced into the tank at 30° C. over 30 minutes. The temperature was raided to 70° C. and the reaction was performed for 3 hours. The reaction solution was taken out from the tank and the resulting solid component was washed with n-heptane.

After 2.5 liters of dehydrated and deoxygenated n-heptane was introduced into the tank equipped with a stirrer, 0.3 mols of phthalic chloride was introduced thereto at 90° C. over 30 minutes while mixing, and the resulting mixture was reacted at 95° C. for 1 hour. After termination of the reaction, the reaction mixture was washed with n-heptane. Subsequently, 2 liters of titanium tetrachloride was introduced at room temperature, and then the temperature was raised to 100° C. and the reaction was carried out for 2 hours. After termination of the reaction, the reaction mixture was washed with n-heptane. Further, 0.6 liters of silicon tetrachloride and 8 liters of n-heptane were introduced into the tank, and the resulting mixture was reacted at 90° C. for 1 hour. The reaction mixture was sufficiently washed with n-heptane to yield a solid component. The solid component contained 1.30 wt % of titanium.

In the next place, 8 liters of n-heptane, 400 g of solid component obtained above, 0.27 mols of t-butylmethyldimethoxysilane, and 0.27 mols of vinyltrimethylsilane were introduced to the tank equipped with a stirrer purged with nitrogen, and they were brought into contact with each other at 30° C. for 1 hour. The reaction mixture was then cooled to 15° C., and 1.5 mols of triethylaluminum diluted with n-heptane was introduced at 15° C. over 30 minutes. After the introduction, the temperature was raised to 30° C. and the reaction was carried out for 2 hours. The reaction mixture was then taken out and washed with n-heptane to yield 390 g of solid catalyst component (b).

The obtained solid catalyst component (b) contained 1.22 wt % of titanium.

Further, 6 liters of n-heptane, and 1 mol of triisobutyl aluminum diluted with n-heptane were introduced over 30 minutes at 15° C., followed by prepolymerization by introducing propylene at a rate of about 0.4 kg/hr for 1 hour while controlling the temperature so as not to exceed 20° C. As a result, solid catalyst component (b) containing polypropylene in which 0.9 g of propylene had been polymerized per g of a solid was obtained.

(ii) Manufacture of Propylene/Ethylene Block Copolymer

Polymerization was performed with a continuous reactor in which two fluidized bed reactors having an internal volume of 230 liters were connected to each other. In the first reactor, the polymerization temperature and propylene partial pressure were set at 85° C. and 2.2 MPa, respectively, and hydrogen as the molecular weight controller was continuously fed in a hydrogen/propylene molar ratio of 0.037 while feeding triethylaluminum at a rate of 5.25 g/hr, and the above catalyst as solid catalyst component (b) at a polymer polymerization rate of 20 kg/hr. The powder obtained by polymerization in the first reactor (crystalline propylene polymer) was continuously taken out from the reactor so that the amount of the powder remaining in the reactor is 60 kg, and transferred continuously to the second reactor (the former stage polymerization step).

The polymerization temperature and pressure were set at 80° C. and 2.0 MPa, respectively, propylene and ethylene were continuously fed in an ethylene/propylene molar ratio of 0.25, hydrogen as the molecular weight controller was continuously fed in a hydrogen/propylene molar ratio of 0.026, and ethyl alcohol as the active hydrogen compound was fed so that it would be 2.1 times the mol of triethylaluminum. The powder obtained by the polymerization in the second reactor was continuously taken out into a vessel so that the amount of the powder remaining in the reactor is 40 kg. A nitrogen gas containing water vapor was fed to terminate the reaction, whereby a propylene/ethylene block copolymer was obtained (the latter stage polymerization step). The propylene/ethylene block copolymer obtained was designated as Modifier 17.

Manufacture Example 8

Modifier 18 was manufactured in the same manner as in Manufacture Example 2, except for changing the feeding rate of hydrogen to 172 liters/hr in the former stage polymerization step, and in the latter stage polymerization step, the feeding rate of ethylene to 0.48 kg/hr, and the feeding rate of propylene to 2.73 kg/hr. The pressure in the former stage polymerization step was 0.15 MPa at the time of polymerization initiation, 0.78 MPa at the point of time of stopping of propylene feeding, and the pressure in the latter stage polymerization step was 0.18 MPa at the time of stopping of monomer feeding. The yield was 58.6 kg.

Manufacture Example 9

Polymerization was performed with a continuous reactor in which two fluidized bed reactors having an internal volume of 230 liters were connected to each other. In the first reactor, the polymerization temperature and propylene partial pressure were set at 55° C. and 1.8 MPa, respectively, and hydrogen as the molecular weight controller was continuously fed in a hydrogen/propylene molar ratio of 0.020 while feeding triethylaluminum at a rate of 5.25 g/hr, and the above catalyst as solid catalyst component (b) at a polymer polymerization rate of 12 kg/hr. The powder obtained by polymerization in the first reactor (crystalline propylene polymer) was continuously taken out from the reactor so that the amount of the powder remaining in the reactor is 40 kg, and transferred continuously to the second reactor (the former stage polymerization step).

In the next place, the polymerization temperature and pressure were set at 80° C. and 2.0 MPa, respectively, propylene and ethylene were continuously fed in an ethylene/propylene molar ratio of 0.50, hydrogen as the molecular weight controller was continuously fed in a hydrogen/propylene molar ratio of 0.0008, and ethyl alcohol as the active hydrogen compound was fed so that it would be 2.1 times the mol of triethylaluminum. The powder obtained by the polymerization in the second reactor was continuously taken out into a vessel so that the amount of the powder remaining in the reactor is 50 kg. A nitrogen gas containing water vapor was fed to terminate the reaction, whereby a propylene/ethylene block copolymer was obtained (the latter stage polymerization step). The propylene/ethylene block copolymer obtained was designated as Modifier 21.

Manufacture Example 10

The procedure in Manufacture Example 9 was repeated, except for changing the molar ratio of hydrogen/propylene to 0.057 in the former stage polymerization step, and in the latter stage polymerization step, the molar ratio of ethylene/propylene to 0.945. Thus, a propylene/ethylene block copolymer (Modifier 22) was obtained.

Manufacture Example 11

The procedure in Manufacture Example 9 was repeated, except for changing the polymerization temperature to 65° C., the molar ratio of hydrogen/propylene to 0.027, and the amount of the powder remaining in the reactor to 60 kg in the former stage polymerization step, and in the latter stage polymerization step, the molar ratio of ethylene/propylene to 0.40, and the amount of the powder remaining in the reactor to 40 kg. Thus, a propylene/ethylene block copolymer (Modifier 23) was obtained.

Manufacture Example 12

The procedure in Manufacture Example 7 was repeated, except for changing the molar ratio of hydrogen/propylene to 0.035 in the former stage polymerization step, and in the latter stage polymerization step, the molar ratio of ethylene/propylene to 0.84, and the molar ratio of hydrogen/propylene to 0.023. Thus, a propylene/ethylene block copolymer (Modifier 24) was obtained.

Manufacture Example 13

Modifier 25 was manufactured in the same manner as in Manufacture Example 2, except for changing the feeding amount of hydrogen before initiation of polymerization to 15 liters, and in the former stage polymerization step, the feeding rate of hydrogen to 20 liters/hr. The pressure in the former stage polymerization step was 0.15 MPa at the time of polymerization initiation, 0.76 MPa at the point of time of stopping of propylene feeding, and the pressure in the latter stage polymerization step was 0.13 MPa at the time of stopping of monomer feeding. The yield was 58.3 kg.

Manufacture Example 14

After a stainless steel autoclave equipped with a stirrer having an internal volume of 400 liters was thoroughly purged with a propylene gas, 120 liters of dehydrated and deoxygenated n-heptane was introduced as the polymerization solvent. Under the condition of temperature of 70° C., 30 g of triethylaluminum, 15 liters of hydrogen, and 15 g of the catalyst a were put in the autoclave. After the inner temperature of the autoclave was raised to 75° C., propylene was fed at a rate of 15.75 kg/hr and at the same time hydrogen was fed at a rate of 15 liters/hr, thus polymerization was initiated. The introduction of propylene and hydrogen was stopped after 200 minutes. The pressure was 0.15 MPa at the time of polymerization initiation, and increased with the passage of time during the feeding of propylene until 0.42 MPa at the point of time of stopping of feeding. After that, unconverted gas in the reactor was discharged until 0.13 MPa to obtain crystalline propylene polymer portion (the former stage polymerization step).

In the next place, after setting the inner temperature of the autoclave at 65° C., 16 cc of n-butanol was introduced, and ethylene was fed at a rate of 1.06 kg/hr and at the same time propylene was fed at a rate of 8.58 kg/hr. The feeding of ethylene and propylene was stopped after 140 minutes, and the pressure was increased with the passage of time during the feeding of the monomers until 0.48 MPa at the point of time of stopping of feeding (the latter stage polymerization step).

The obtained slurry was subjected to post treatment in the same manner as in Manufacture Example 1, and 54 kg of Modifier 26 was obtained.

TABLE 1

| | Ethylene/Propylene Block Copolymer (A) | | | | | |
|---|---|---|---|---|---|---|
| | Crystalline Propylene Polymer Portion (A1) | | Propylene/Ethylene Random Copolymer Portion (A2) | | | |
| | MFR (g/10 min) | Ratio (wt %) | $[\eta]_{copoly}$ (dl/g) | Ethylene Content (wt %) | Ratio (wt %) | (A) in All MFR (g/10 min) |
| Modifier-11 | 634 | 88 | 7.3 | 30 | 12 | 165 |
| Modifier-12 | 820 | 89 | 8.8 | 45 | 11 | 212 |
| Modifier-13 | 658 | 85 | 8 | 32 | 15 | 111 |
| Modifier-14 | 510 | 92 | 8 | 27 | 8 | 145 |
| Modifier-15 | 140 | 93 | 7.8 | 38 | 7 | 65 |
| Modifier-16 | 410 | 100 | 0 | — | — | 410 |
| Modifier-17 | 74 | 92 | 2.9 | 27 | 8 | 50 |
| Modifier-18 | 530 | 92 | 8 | 15 | 8 | 135 |

TABLE 2

| | Ethylene/Propylene Block Copolymer (B) | | | | | |
|---|---|---|---|---|---|---|
| | Crystalline Propylene Polymer Portion (B1) | | Propylene/Ethylene Random Copolymer Portion (B2) | | | |
| | MFR (g/10 min) | Ratio (wt %) | $[\eta]_{copoly}$ (dl/g) | Ethylene Content (wt %) | Ratio (wt %) | (B) in All MFR (g/10 min) |
| Modifier-21 | 30 | 45 | 6.8 | 40 | 55 | 0.41 |
| Modifier-22 | 150 | 51 | 6 | 57.5 | 49 | 1.9 |
| Modifier-23 | 57 | 69 | 7 | 40 | 31 | 4 |
| Modifier-24 | 70 | 84.5 | 3.6 | 55 | 15.5 | 29 |
| Modifier-25 | 19 | 92 | 8 | 47 | 8 | 10 |
| Modifier-26 | 10 | 65 | 10.5 | 11.6 | 35 | 0.5 |

3. Components (C) to (E)

(PP-1) to (PP-4) shown in Table 3 were used as the propylene/ethylene block copolymer serving as component (C), (Talc-1) shown in Table 4 was used as the inorganic filler serving as component (D), and (Elastomer-1) to (Elastomer-4) shown in Table 5 were used as the ethylene elastomer or styrene elastomer serving as component (E).

Compositions comprising components (C) to (E) shown in Tables 3 to 5 were formulated in advance in a ratio shown in Table 6, and 0.1 weight parts of tetrakis [methylene-3-(3',5'-di-t-butyl-4'-hydroxyphenyl)propionate]methane (Irganox 1010, a trade name; manufactured by Ciba Geigy), and 0.05 weight parts of tris(2,4-di-t-butylphenyl)phosphite (Irgafos 168, a trade name; manufactured by Ciba Geigy) were blended as the antioxidants. Each of the resulting mixtures was mixed for 5 minutes in a Henschel mixer, followed by kneading and granulation at prescribed temperature of 210° C. in a twin-screw kneader (2FCM, manufactured by Kobe Steel Ltd.) to prepare materials to be modified (Base material-1 to Base material-9).

TABLE 3

| Component (C) | Content of Crystalline Polypropylene Portion (wt %) | Content of Propylene/Ethylene Random Copolymer Portion (wt %) | MFR (g/10 min) |
|---|---|---|---|
| PP-1 | 82 | 18 | 28 |
| PP-2 | 73 | 27 | 31 |

TABLE 3-continued

| Component (C) | Content of Crystalline Polypropylene Portion (wt %) | Content of Propylene/Ethylene Random Copolymer Portion (wt %) | MFR (g/10 min) |
|---|---|---|---|
| PP-3 | 93 | 7 | 29 |
| PP-4 | 68 | 32 | 31 |

TABLE 4

| Component (D) | Average Particle Size (μm) | Kind |
|---|---|---|
| Talc-1 | 5 | C31 (manufactured by Nippon Talc Co., Ltd.) |

TABLE 5

| Component (E) | MFR (g/10 min) | Density (g/cm$^3$) | Kind |
|---|---|---|---|
| Elastomer-1 | 6.3 | 0.862 | Ethylene/butene copolymer elastomer (Tafmer A4050S, manufactured by Mitsui Chemical Inc. |
| Elastomer-2 | 10 | 0.890 | Hydrogenated styrene/butadiene/styrene triblock copolymer (Tuftec H1052, manufactured by Asahi Kasei Corporation) |
| Elastomer-3 | 11 | 0.870 | Ethylene/octene copolymer elastomer (Engage EG8200, manufactured by Dow Chemical Company) |
| Elastomer-4 | 0.6 | 0.861 | Ethylene/butene copolymer elastomer (EBM3011P, manufactured by JSR) |

TABLE 6

| Composition | Component (C) Kind | Weight Parts | Component (D) Kind | Weight Parts | Component (E) Kind | Weight Parts |
|---|---|---|---|---|---|---|
| Base Material-1 | PP-1 | 73 | Talc-1 | 12 | Elastomer-1 | 15 |
| Base Material-2 | PP-1 | 73 | Talc-1 | 12 | Elastomer-2 | 15 |
| Base Material-3 | PP-1 | 73 | Talc-1 | 12 | Elastomer-3 | 30 |
| Base Material-4 | PP-1 | 73 | Talc-1 | 12 | Elastomer-4 | 33 |
| Base Material-5 | PP-2 | 60 | Talc-1 | 20 | Elastomer-1 | 23 |
| Base Material-6 | PP-3 | 73 | Talc-1 | 12 | Elastomer-1 | 15 |
| Base Material-7 | PP-4 | 88 | Talc-1 | 12 | — | — |
| Base Material-8 | PP-1 | 85 | — | — | Elastomer-1 | 15 |
| Base Material-9 | PP-2 | 85 | Talc-1 | 12 | Elastomer-1 | 10 |

Example 1

A polypropylene resin composition was obtained by adding, to 100 weight parts of a mixture comprising Base Material 1 (85 wt %), Modifier 11 (10 wt %), and Modifier 21 (5 wt %), 0.1 weight parts of tetrakis[methylene-3-(3',5'-di-t-butyl-4'-hydroxyphenyl)propionate]methane (Irganox 1010, a trade name, manufactured by Ciba Geigy), and 0.05 weight parts of tris(2,4-di-t-butylphenyl)phosphite (Irgafos 168, a trade name, manufactured by Ciba Geigy) as the antioxidants, mixing them in a Henschel mixer for 5 minutes, and kneading and granulating the resulting mixture at a prescribed temperature of 210° C. in a twin-screw kneader (KCM, manufactured by Kobe Steel Ltd.). The resulting polypropylene resin compositions were evaluated for physical properties (MFR, distance to flow mark, flexural modulus, Izod impact strength at −30° C., and void characteristics). The results of evaluations are shown in Table 7 below.

Examples 2 to 18

Comparative Examples 1 to 19

Each polypropylene resin composition was obtained by blending the modifier shown in Table 1 and the base material shown in Table 6 in the compositional ratio shown in Tables 7 and 8, blending the antioxidant, and kneading and granulating in the same manner as in Example 1. The obtained polypropylene resin compositions were evaluated for physical properties (MFR, distance to flow mark, flexural modulus, Izod impact strength at −30° C., and void characteristics). The results of evaluations are shown in Tables 7 and 8 below.

TABLE 7

| | Base Material | | Component (A) | | Component (B) | | MFR | | |
|---|---|---|---|---|---|---|---|---|---|
| | Kind | wt % | Kind | wt % | Kind | wt % | g/10 min | Rate of Change | Judgment |
| Ex. 1 | Base Material-1 | 85 | Modifier-11 | 10 | Modifier-21 | 5 | 23 | 1.00 | ○ |
| Ex. 2 | Base Material-1 | 85 | Modifier-12 | 10 | Modifier-21 | 5 | 23.6 | 1.02 | ○ |
| Ex. 3 | Base Material-1 | 85 | Modifier-13 | 10 | Modifier-21 | 5 | 22 | 0.95 | ○ |
| Ex. 4 | Base Material-1 | 85 | Modifier-14 | 10 | Modifier-21 | 5 | 22.7 | 0.98 | ○ |
| Ex. 5 | Base Material-1 | 85 | Modifier-11 | 10 | Modifier-22 | 5 | 25.3 | 1.10 | ○ |
| Ex. 6 | Base Material-1 | 85 | Modifier-11 | 10 | Modifier-23 | 5 | 26.1 | 1.13 | ○ |
| Ex. 7 | Base Material-1 | 85 | Modifier-18 | 10 | Modifier-21 | 5 | 21.9 | 0.95 | ○ |
| Ex. 8 | Base Material-1 | 75 | Modifier-11 | 15 | Modifier-21 | 10 | 20 | 0.87 | ○ |
| Ex. 9 | Base Material-1 | 90 | Modifier-11 | 5 | Modifier-21 | 5 | 20.2 | 0.87 | ○ |
| Ex. 10 | Base Material-1 | 93 | Modifier-11 | 4 | Modifier-21 | 3 | 21.7 | 1.03 | ○ |
| Ex. 11 | Base Material-2 | 85 | Modifier-11 | 10 | Modifier-21 | 5 | 22.7 | 0.99 | ○ |
| Ex. 12 | Base Material-3 | 85 | Modifier-11 | 10 | Modifier-21 | 5 | 23.2 | 1.01 | ○ |
| Ex. 13 | Base Material-4 | 85 | Modifier-11 | 10 | Modifier-21 | 5 | 16.8 | 1.06 | ○ |
| Ex. 14 | Base Material-5 | 85 | Modifier-11 | 10 | Modifier-21 | 5 | 20.8 | 1.01 | ○ |
| Ex. 15 | Base Material-7 | 85 | Modifier-11 | 10 | Modifier-21 | 5 | 29 | 1.00 | ○ |
| Ex. 16 | Base Material-8 | 85 | Modifier-11 | 10 | Modifier-21 | 5 | 23.6 | 1.03 | ○ |
| Ex. 17 | Base Material-9 | 85 | Modifier-11 | 10 | Modifier-21 | 5 | 30 | 1.19 | ○ |
| Ex. 18 | Base Material-6 | 85 | Modifier-11 | 10 | Modifier-21 | 5 | 23 | 0.96 | ○ |

| | Distance to Flow Mark | | Flexural Modulus | | | Izod Impact Strength (−30° C.) | | | Voids |
|---|---|---|---|---|---|---|---|---|---|
| | Mm | Judgment | MPa | Rate of Change | Judgment | kg/cm$^2$ | Rate of Change | Judgment | Judgment |
| Ex. 1 | 162 | ○ | 1,350 | 0.98 | ○ | 5.6 | 1.00 | ○ | ○ |
| Ex. 2 | 167 | ○ | 1,350 | 0.98 | ○ | 5.6 | 1.00 | ○ | ○ |
| Ex. 3 | 175 | ○ | 1,340 | 0.97 | ○ | 5.8 | 1.04 | ○ | ○ |
| Ex. 4 | 150 | ○ | 1,370 | 0.99 | ○ | 5.6 | 1.00 | ○ | ○ |
| Ex. 5 | 173 | ○ | 1,360 | 0.99 | ○ | 5.5 | 0.98 | ○ | ○ |
| Ex. 6 | 170 | ○ | 1,380 | 1.00 | ○ | 5.0 | 0.89 | ○ | ○ |
| Ex. 7 | 153 | ○ | 1,310 | 0.95 | ○ | 5.2 | 0.93 | ○ | ○ |
| Ex. 8 | 220 | ○ | 1,250 | 0.91 | ○ | 6.9 | 1.23 | ○ | ○ |
| Ex. 9 | 115 | ○ | 1,350 | 0.98 | ○ | 5.6 | 1.00 | ○ | ○ |
| Ex. 10 | 110 | ○ | 1,380 | 1.00 | ○ | 5.7 | 1.02 | ○ | ○ |
| Ex. 11 | 163 | ○ | 1,280 | 0.98 | ○ | 6.6 | 1.02 | ○ | ○ |
| Ex. 12 | 130 | ○ | 1,300 | 1.00 | ○ | 4.8 | 1.02 | ○ | ○ |
| Ex. 13 | 188 | ○ | 1,410 | 1.03 | ○ | 6.3 | 1.00 | ○ | ○ |
| Ex. 14 | 130 | ○ | 1,400 | 0.95 | ○ | 5.5 | 0.96 | ○ | ○ |
| Ex. 15 | 187 | ○ | 1,480 | 1.09 | ○ | 4.0 | 0.82 | ○ | ○ |
| Ex. 16 | 220 | ○ | 900 | 1.11 | ○ | 6.0 | 0.86 | ○ | ○ |
| Ex. 17 | 190 | ○ | 1,300 | 1.00 | ○ | 5.5 | 0.92 | ○ | ○ |
| Ex. 18 | 167 | ○ | 1,640 | 0.96 | ○ | 3.6 | 0.84 | ○ | ○ |

TABLE 8

| | Base Material | | Component (A) | | Component (B) | | MFR | | |
|---|---|---|---|---|---|---|---|---|---|
| | Kind | wt % | Kind | wt % | Kind | wt % | g/10 min | Rate of Change | Judgment |
| Comp. Ex. 1 | Base Material-1 | 100 | — | — | — | — | 23.1 | — | — |
| Comp. Ex. 2 | Base Material-2 | 100 | — | — | — | — | 22.1 | — | — |
| Comp. Ex. 3 | Base Material-3 | 100 | — | — | — | — | 23 | — | — |
| Comp. Ex. 4 | Base Material-4 | 100 | — | — | — | — | 15.6 | — | — |
| Comp. Ex. 5 | Base Material-5 | 100 | — | — | — | — | 20.6 | — | — |
| Comp. Ex. 6 | Base Material-7 | 100 | — | — | — | — | 29 | — | — |
| Comp. Ex. 7 | Base Material-8 | 100 | — | — | — | — | 23 | — | — |
| Comp. Ex. 8 | Base Material-9 | 100 | — | — | — | — | 25.2 | — | — |
| Comp. Ex. 9 | Base Material-1 | 90 | Modifier-11 | 10 | — | — | 24.1 | — | — |
| Comp. Ex. 10 | Base Material-1 | 90 | — | — | Modifier-21 | 10 | 12.3 | 0.53 | X |
| Comp. Ex. 11 | Base Material-1 | 40 | Modifier-11 | 30 | Modifier-21 | 30 | 10.8 | 0.47 | X |
| Comp. Ex. 12 | Base Material-1 | 99 | Modifier-11 | 0.5 | Modifier-21 | 0.5 | 22.5 | 0.97 | ○ |
| Comp. Ex. 13 | Base Material-1 | 85 | Modifier-15 | 10 | Modifier-21 | 5 | 20.7 | 0.90 | ○ |
| Comp. Ex. 14 | Base Material-1 | 85 | Modifier-16 | 10 | Modifier-21 | 5 | 25.4 | 1.10 | ○ |
| Comp. Ex. 15 | Base Material-1 | 85 | Modifier-17 | 10 | Modifier-21 | 5 | 20.1 | 0.87 | ○ |
| Comp. Ex. 16 | Base Material-1 | 85 | Modifier-11 | 10 | Modifier-24 | 5 | 25.9 | 1.12 | ○ |
| Comp. Ex. 17 | Base Material-1 | 85 | Modifier-11 | 10 | Modifier-25 | 5 | 18.1 | 0.78 | X |

TABLE 8-continued

| | | | | | | | | | | |
|---|---|---|---|---|---|---|---|---|---|---|
| Comp. Ex. 18 | Base Material-1 | 80 | Modifier-11 | 10 | Modifier-26 | 10 | 19 | 0.82 | ○ | |
| Comp. Ex. 19 | Base Material-6 | 100 | — | — | — | — | 24 | — | — | |

| | Distance to Flow Mark | | Flexural Modulus | | | Izod Impact Strength (−30° C.) | | | Voids |
|---|---|---|---|---|---|---|---|---|---|
| | | | | Rate of | | | Rate of | | |
| | Mm | Judgment | MPa | Change | Judgment | kg/cm² | Change | Judgment | Judgment |
| Comp. Ex. 1 | 68 | X | 1,380 | — | — | 5.6 | — | — | X |
| Comp. Ex. 2 | 75 | X | 1,300 | — | — | 6.5 | — | — | ○ |
| Comp. Ex. 3 | 62 | X | 1,300 | — | — | 4.7 | — | — | X |
| Comp. Ex. 4 | 95 | X | 1,370 | — | — | 6.3 | — | — | ○ |
| Comp. Ex. 5 | 78 | X | 1,480 | — | — | 5.7 | — | — | X |
| Comp. Ex. 6 | 76 | X | 1,360 | — | — | 4.9 | — | — | ○ |
| Comp. Ex. 7 | 93 | X | 810 | — | — | 7.0 | — | — | X |
| Comp. Ex. 8 | 90 | X | 1,300 | — | — | 6.0 | — | — | X |
| Comp. Ex. 9 | 142 | ○ | 1,440 | 0.96 | ○ | 4.3 | 0.77 | ○ | X |
| Comp. Ex. 10 | 68 | X | 1,260 | 0.91 | ○ | 6.3 | 1.12 | ○ | ○ |
| Comp. Ex. 11 | 200 | ○ | 1,010 | 0.73 | X | 8.1 | 1.45 | X | ○ |
| Comp. Ex. 12 | 80 | X | 1,420 | 1.03 | ○ | 5.6 | 1.00 | ○ | X |
| Comp. Ex. 13 | 75 | X | 1,370 | 0.99 | ○ | 5.7 | 1.02 | ○ | ○ |
| Comp. Ex. 14 | 97 | X | 1,400 | 1.01 | ○ | 4.0 | 0.71 | X | ○ |
| Comp. Ex. 15 | 93 | X | 1,370 | 0.99 | ○ | 5.5 | 0.98 | ○ | ○ |
| Comp. Ex. 16 | 138 | ○ | 1,430 | 1.03 | ○ | 4.4 | 0.78 | X | X |
| Comp. Ex. 17 | 145 | ○ | 1,450 | 1.05 | ○ | 4.0 | 0.71 | X | X |
| Comp. Ex. 18 | 120 | ○ | 1,350 | 0.97 | ○ | 4.7 | 0.83 | ○ | X |
| Comp. Ex. 19 | 80 | X | 1,700 | — | — | 3.1 | — | — | X |

As is apparent from the results shown in Tables 7 and 8, by using the modifying components in the invention, moldability can be improved without substantially varying mechanical and physical properties.

While the invention has been described in detail and with reference to specific examples thereof, it will be apparent to one skilled in the art that various changes and modifications can be made therein without departing from the spirit and scope thereof.

The present application is related to Japanese patent application filed on Mar. 23, 2006 (Japanese Patent Application No. 2006-079987), and the disclosure of which is incorporated herein by reference.

INDUSTRIAL APPLICABILITY

Only by blending with general purpose polypropylene resins, the propylene block copolymer according to the invention can serve as a moldability modifier capable of controlling the molding processability in injection molding of the resulting polypropylene resin composition and flow mark characteristics at the time of molding. A polypropylene resin composition blended with the molding appearance modifier for polypropylene resins is excellent in molding processability and flow mark characteristics, and especially suitable for large sized injection molding such as automobile exterior parts and the like including bumper, rocker mogol, side mogol, and over fender. Accordingly, even in injection moldings such as automobile exterior parts and the like already in use, by the application of the propylene block copolymer to cases confronting the problems in molding appearance, the achievement of improving effects can be expected. In particular, with the advancement of globalization of economic activities, there is a strong demand for the development of a resin material capable of solving the above problem in resin compositions containing a general purpose resin as a base (the main component) available everywhere in the world. However, general purpose resins for molding appearance modification available everywhere in the world are large in addition amount and have an adverse effect on the physical properties, so that the invention will be a reform technology indispensable for overcoming this problem.

The invention claimed is:

1. A moldability modifier comprising:
   a component (A); and
   a component (B),
   wherein a weight ratio of the component (A) to the component (B) (component (A)/component (B)) is from 3/1 to 1/19, the component (A) is a propylene block copolymer comprising from 80 to 98 wt % of a crystalline propylene homopolymer portion (A1) and from 2 to 20 wt % of a propylene/ethylene random copolymer portion (A2), and satisfying
   that a melt flow rate of the crystalline propylene homopolymer portion (A1) measured according to JIS K7210 at a temperature of 230° C. and under a load of 21.18N is 300 g/10 min or more;
   that an ethylene content of the propylene/ethylene random copolymer portion (A2) is from 10 to 70 wt %;
   that an intrinsic viscosity $[\eta]_{copoly}$ of the propylene/ethylene random copolymer portion (A2) is 6.5 dl/g or more; and
   that a melt flow rate of the propylene block copolymer (A) as a whole ($MFR_A$) is 40 g/10 min or more, and
   the component (B) is a propylene block copolymer comprising from 20 to 79 wt % of a crystalline propylene homopolymer portion (B1) and from 21 to 80 wt % of a propylene/ethylene random copolymer portion (B2), and satisfying
   that a melt flow rate of the crystalline propylene homopolymer portion (B1) measured according to JIS K7210 at a temperature of 230° C. under a load of 21.18N is 20 g/10 min or more;
   that an ethylene content of the propylene/ethylene random copolymer portion (B2) is from 20 to 70 wt %;
   that an intrinsic viscosity $[\eta]_{copoly}$ of the propylene/ethylene random copolymer portion (B2) is from 2.5 to 9.0 dl/g; and
   that a melt flow rate of the propylene block copolymer (B) as a whole ($MFR_B$) is from 0.1 to 50 g/10 min.

2. The moldability modifier as claimed in claim 1, wherein a weight ratio of the component (A) to the component (B) (component (A)/component (B)) is from 3/1 to 1/3.

3. The moldability modifier as claimed in claim 2, wherein a ratio of the melt flow rate of the component (A) ($MFR_A$) to the melt flow rate of the component (B) ($MFR_B$) ($MFR_A/MFR_B$) exceeds 1.

4. The moldability modifier as claimed in claim 1, wherein a ratio of the melt flow rate of the component (A) ($MFR_A$) to the melt flow rate of the component (B) ($MFR_B$) ($MFR_A/MFR_B$) exceeds 1.

5. A polypropylene resin composition comprising:
   from 2 to 30 weight parts of the moldability modifier as claimed in claims 1; and
   100 weight parts of a polypropylene resin material to be modified.

6. The polypropylene resin composition as claimed in claim 5, wherein the polypropylene resin material to be modified is (C) a propylene/ethylene block copolymer.

7. The polypropylene resin composition as claimed in claim 5, wherein the polypropylene resin material to be modified is a polypropylene resin composition comprising from 65 to 99 wt % of (C) propylene/ethylene block copolymer, and from 1 to 35 wt % of (D) an inorganic filler.

8. The polypropylene resin composition as claimed in claim 5, wherein the polypropylene resin material to be modified is a polypropylene resin composition comprising from 65 to 99 wt % of (C) propylene/ethylene block copolymer, and from 1 to 35 wt % of (E) an ethylene elastomer or a styrene elastomer.

9. The polypropylene resin composition as claimed in claim 5, wherein the polypropylene resin material to be modified is a polypropylene resin composition comprising: from 40 to 98 wt % of (C) propylene/ethylene block copolymer having a content of 15 wt % or more of rubber extracted with orthodichlorobenzene; from 1 to 40 wt % of (D) inorganic filler; and from 1 to 20 wt % of (E) ethylene elastomer or a styrene elastomer.

10. The polypropylene resin composition as claimed in claim 9, wherein the moldability modifier is blended with the polypropylene resin material to be modified, and a rate of change of MFR, flexural modulus, and IZOD impact strength at −30° C. is less than ±25%.

11. The polypropylene resin composition as claimed in claim 10, wherein the polypropylene resin composition has an MFR of 10 g/10 min or more, and IZOD impact strength at −30° C. of 3 kg/cm² or more.

* * * * *